(12) United States Patent
Tan et al.

(10) Patent No.: US 11,704,275 B2
(45) Date of Patent: Jul. 18, 2023

(54) DYNAMIC PRESENTATION OF INTERCONNECT PROTOCOL CAPABILITY STRUCTURES

(71) Applicant: Intel Corporation, Santa Clara, CA (US)

(72) Inventors: Kuan Hua Tan, Coquitlam (CA); Eng Hun Ooi, Georgetown (MY); Ang Li, Coquitlam (CA)

(73) Assignee: Intel Corporation, Santa Clara, CA (US)

( * ) Notice: Subject to any disclaimer, the term of this patent is extended or adjusted under 35 U.S.C. 154(b) by 156 days.

(21) Appl. No.: 17/387,261

(22) Filed: Jul. 28, 2021

(65) Prior Publication Data

US 2021/0357350 A1    Nov. 18, 2021

Related U.S. Application Data

(62) Division of application No. 16/513,941, filed on Jul. 17, 2019, now Pat. No. 11,080,223.

(51) Int. Cl.
 *G06F 13/42* (2006.01)
 *G06F 9/445* (2018.01)

(52) U.S. Cl.
 CPC ...... *G06F 13/4221* (2013.01); *G06F 9/44505* (2013.01); *G06F 2213/0026* (2013.01)

(58) Field of Classification Search
 None
 See application file for complete search history.

(56) References Cited

U.S. PATENT DOCUMENTS

| | | |
|---|---|---|
| 6,647,434 B1 | 11/2003 | Kamepalli |
| 2002/0194400 A1 | 12/2002 | Porterfield |
| 2009/0222814 A1 * | 9/2009 | Astrand ............... G06F 9/45537 718/1 |

* cited by examiner

*Primary Examiner* — Scott C Sun
(74) *Attorney, Agent, or Firm* — Alliance IP, LLC

(57) ABSTRACT

A device connected by a link to a host system can include a first port to receive a capability configuration message across a link and a message request receiving logic comprising hardware circuitry to identify a capability of the device identified in the capability configuration message, determine that the capability is to be presented or hidden from operation based on a capability hide enable bit in the capability configuration message, and configure a capability linked list to present or hide the capability based on the determination. The device can also include a message response generator logic comprising hardware circuitry to generate a response message indicating that the capability is to be presented or hidden from operation. The device can include a second port to transmit the response message across the link.

25 Claims, 14 Drawing Sheets

DYNAMIC PRESENTATION OF INTERCONNECT PROTOCOL CAPABILITY STRUCTURES

CROSS-REFERENCE TO RELATED APPLICATIONS

This application is a division of U.S. patent application Ser. No. 16/513,941 filed Jul. 17, 2019, entitled "DYNAMIC PRESENTATION OF INTERCONNECT PROTOCOL CAPABILITY STRUCTURES." The disclosures of the prior applications are considered part of and are hereby incorporated by reference in their entirety in the disclosure of this application.

BACKGROUND

Interconnects can be used to provide communication between different devices within a system, some type of interconnect mechanism is used. One typical communication protocol for communications interconnects between devices in a computer system is a Peripheral Component Interconnect Express (PCI Express™ (PCIe™)) communication protocol. This communication protocol is one example of a load/store input/output (I/O) interconnect system. The communication between the devices is typically performed serially according to this protocol at very high speeds.

Devices can be connected across various numbers of data links, each data link including a plurality of data lanes. Upstream devices and downstream devices undergo link training upon initialization to optimize data transmissions across the various links and lanes.

DETAILED DESCRIPTION

Figure 1:
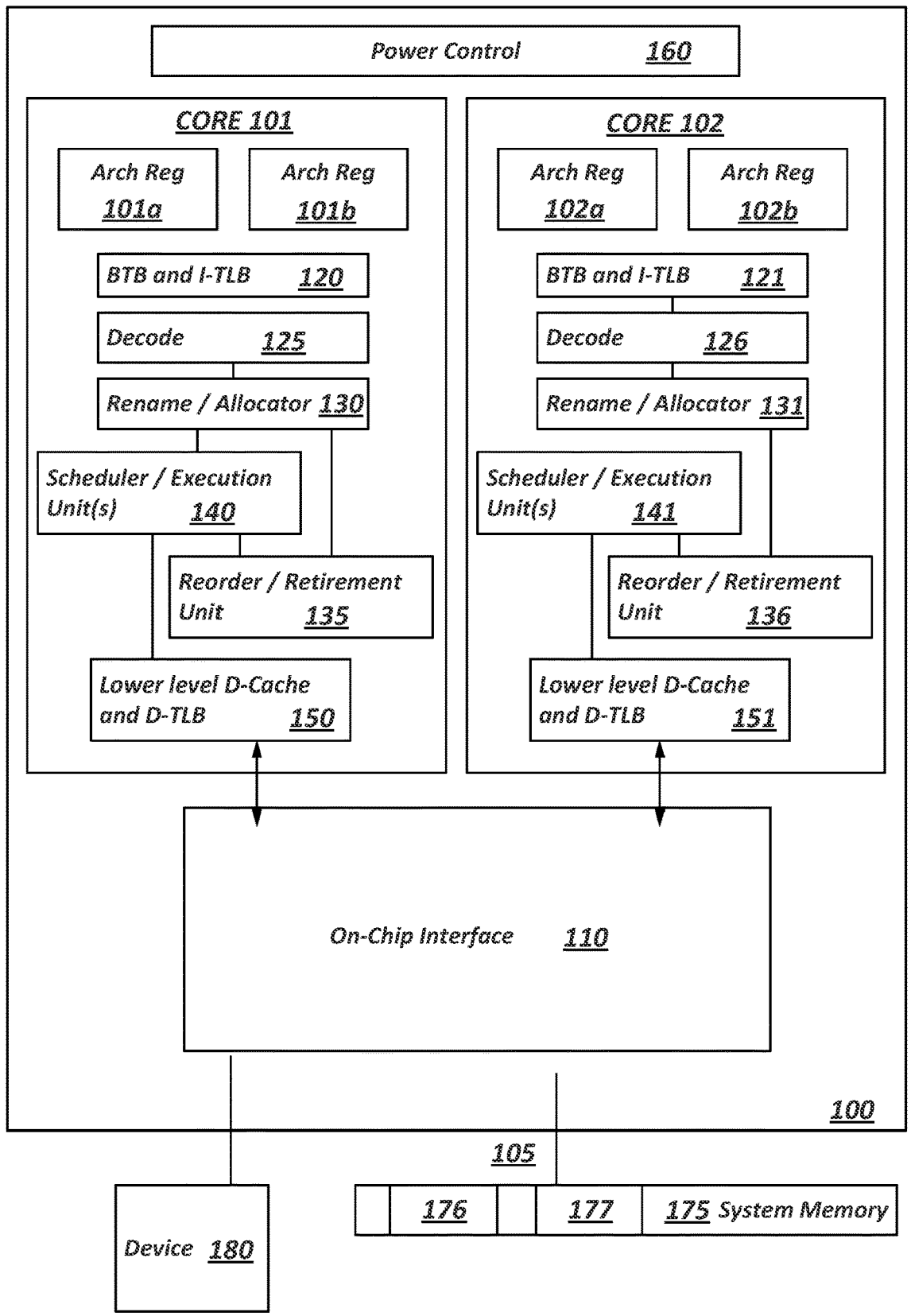
FIG. 1 illustrates an embodiment of a block diagram for a computing system including a multicore processor.

In the following description, numerous specific details are set forth, such as examples of specific types of processors and system configurations, specific hardware structures, specific architectural and micro architectural details, specific register configurations, specific instruction types, specific system components, specific measurements/heights, specific processor pipeline stages and operation etc. in order to provide a thorough understanding of the present disclosure. It will be apparent, however, to one skilled in the art that these specific details need not be employed to practice the present disclosure. In other instances, well known components or methods, such as specific and alternative processor architectures, specific logic circuits/code for described algorithms, specific firmware code, specific interconnect operation, specific logic configurations, specific manufacturing techniques and materials, specific compiler implementations, specific expression of algorithms in code, specific power down and gating techniques/logic and other specific operational details of computer system have not been described in detail in order to avoid unnecessarily obscuring the present disclosure.

Although the following embodiments may be described with reference to energy conservation and energy efficiency in specific integrated circuits, such as in computing platforms or microprocessors, other embodiments are applicable to other types of integrated circuits and logic devices. Similar techniques and teachings of embodiments described herein may be applied to other types of circuits or semiconductor devices that may also benefit from better energy efficiency and energy conservation. For example, the disclosed embodiments are not limited to desktop computer systems or Ultrabooks™. And may be also used in other devices, such as handheld devices, tablets, other thin notebooks, systems on a chip (SOC) devices, and embedded applications. Some examples of handheld devices include cellular phones, Internet protocol devices, digital cameras, personal digital assistants (PDAs), and handheld PCs. Embedded applications typically include a microcontroller, a digital signal processor (DSP), a system on a chip, network computers (NetPC), set-top boxes, network hubs, wide area network (WAN) switches, or any other system that can perform the functions and operations taught below. Moreover, the apparatus', methods, and systems described herein are not limited to physical computing devices, but may also relate to software optimizations for energy conservation and efficiency. As will become readily apparent in the description below, the embodiments of methods, apparatus', and systems described herein (whether in reference to hardware, firmware, software, or a combination thereof) are vital to a 'green technology' future balanced with performance considerations.

As computing systems are advancing, the components therein are becoming more complex. As a result, the interconnect architecture to couple and communicate between the components is also increasing in complexity to ensure bandwidth requirements are met for optimal component operation. Furthermore, different market segments demand different aspects of interconnect architectures to suit the market's needs. For example, servers require higher performance, while the mobile ecosystem is sometimes able to sacrifice overall performance for power savings. Yet, it is a singular purpose of most fabrics to provide highest possible performance with maximum power saving. Below, a number of interconnects are discussed, which would potentially benefit from aspects of the disclosure described herein.

Referring to FIG. 1, an embodiment of a block diagram for a computing system including a multicore processor is depicted. Processor 100 includes any processor or processing device, such as a microprocessor, an embedded processor, a digital signal processor (DSP), a network processor, a handheld processor, an application processor, a co-processor, a system on a chip (SOC), or other device to execute code. Processor 100, in one embodiment, includes at least two cores—core 101 and 102, which may include asymmetric cores or symmetric cores (the illustrated embodiment). However, processor 100 may include any number of processing elements that may be symmetric or asymmetric.

In one embodiment, a processing element refers to hardware or logic to support a software thread. Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor (or processor socket) typically refers to an integrated circuit, which potentially includes any number of other processing elements, such as cores or hardware threads.

A core often refers to logic located on an integrated circuit capable of maintaining an independent architectural state, wherein each independently maintained architectural state is associated with at least some dedicated execution resources. In contrast to cores, a hardware thread typically refers to any logic located on an integrated circuit capable of maintaining an independent architectural state, wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

Physical processor 100, as illustrated in FIG. 1, includes two cores—core 101 and 102. Here, core 101 and 102 are considered symmetric cores, i.e. cores with the same configurations, functional units, and/or logic. In another embodiment, core 101 includes an out-of-order processor core, while core 102 includes an in-order processor core. However, cores 101 and 102 may be individually selected from any type of core, such as a native core, a software managed core, a core adapted to execute a native Instruction Set Architecture (ISA), a core adapted to execute a translated Instruction Set Architecture (ISA), a co-designed core, or other known core. In a heterogeneous core environment (i.e. asymmetric cores), some form of translation, such a binary translation, may be utilized to schedule or execute code on one or both cores. Yet to further the discussion, the functional units illustrated in core 101 are described in further detail below, as the units in core 102 operate in a similar manner in the depicted embodiment.

As depicted, core 101 includes two hardware threads 101a and 101b, which may also be referred to as hardware thread slots 101a and 101b. Therefore, software entities, such as an operating system, in one embodiment potentially view processor 100 as four separate processors, i.e., four logical processors or processing elements capable of executing four software threads concurrently. As alluded to above, a first thread is associated with architecture state registers 101a, a second thread is associated with architecture state registers 101b, a third thread may be associated with architecture state registers 102a, and a fourth thread may be associated with architecture state registers 102b. Here, each of the architecture state registers (101a, 101b, 102a, and 102b) may be referred to as processing elements, thread slots, or thread units, as described above. As illustrated, architecture state registers 101a are replicated in architecture state registers 101b, so individual architecture states/contexts are capable of being stored for logical processor 101a and logical processor 101b. In core 101, other smaller resources, such as instruction pointers and renaming logic in allocator and renamer block 130 may also be replicated for threads 101a and 101b. Some resources, such as re-order buffers in reorder/retirement unit 135, ILTB 120, load/store buffers, and queues may be shared through partitioning. Other resources, such as general purpose internal registers, page-table base register(s), low-level data-cache and data-TLB 115, execution unit(s) 140, and portions of out-of-order unit 135 are potentially fully shared.

Processor 100 often includes other resources, which may be fully shared, shared through partitioning, or dedicated by/to processing elements. In FIG. 1, an embodiment of a purely exemplary processor with illustrative logical units/resources of a processor is illustrated. Note that a processor may include, or omit, any of these functional units, as well as include any other known functional units, logic, or firmware not depicted. As illustrated, core 101 includes a simplified, representative out-of-order (OOO) processor core. But an in-order processor may be utilized in different embodiments. The OOO core includes a branch target buffer 120 to predict branches to be executed/taken and an instruction-translation buffer (I-TLB) 120 to store address translation entries for instructions.

Core 101 further includes decode module 125 coupled to fetch unit 120 to decode fetched elements. Fetch logic, in one embodiment, includes individual sequencers associated with thread slots 101a, 101b, respectively. Usually core 101 is associated with a first ISA, which defines/specifies instructions executable on processor 100. Often machine code instructions that are part of the first ISA include a portion of the instruction (referred to as an opcode), which references/specifies an instruction or operation to be performed. Decode logic 125 includes circuitry that recognizes these instructions from their opcodes and passes the decoded instructions on in the pipeline for processing as defined by the first ISA. For example, as discussed in more detail below decoders 125, in one embodiment, include logic designed or adapted to recognize specific instructions, such as transactional instruction. As a result of the recognition by decoders 125, the architecture or core 101 takes specific, predefined actions to perform tasks associated with the appropriate instruction. It is important to note that any of the tasks, blocks, operations, and methods described herein may be performed in response to a single or multiple instructions;

some of which may be new or old instructions. Note decoders 126, in one embodiment, recognize the same ISA (or a subset thereof). Alternatively, in a heterogeneous core environment, decoders 126 recognize a second ISA (either a subset of the first ISA or a distinct ISA).

In one example, allocator and renamer block 130 includes an allocator to reserve resources, such as register files to store instruction processing results. However, threads 101a and 101b are potentially capable of out-of-order execution, where allocator and renamer block 130 also reserves other resources, such as reorder buffers to track instruction results. Unit 130 may also include a register renamer to rename program/instruction reference registers to other registers internal to processor 100. Reorder/retirement unit 135 includes components, such as the reorder buffers mentioned above, load buffers, and store buffers, to support out-of-order execution and later in-order retirement of instructions executed out-of-order.

Scheduler and execution unit(s) block 140, in one embodiment, includes a scheduler unit to schedule instructions/operation on execution units. For example, a floating point instruction is scheduled on a port of an execution unit that has an available floating point execution unit. Register files associated with the execution units are also included to store information instruction processing results. Exemplary execution units include a floating point execution unit, an integer execution unit, a jump execution unit, a load execution unit, a store execution unit, and other known execution units.

Lower level data cache and data translation buffer (D-TLB) 150 are coupled to execution unit(s) 140. The data cache is to store recently used/operated on elements, such as data operands, which are potentially held in memory coherency states. The D-TLB is to store recent virtual/linear to physical address translations. As a specific example, a processor may include a page table structure to break physical memory into a plurality of virtual pages.

Here, cores 101 and 102 share access to higher-level or further-out cache, such as a second level cache associated with on-chip interface 110. Note that higher-level or further-out refers to cache levels increasing or getting further way from the execution unit(s). In one embodiment, higher-level cache is a last-level data cache—last cache in the memory hierarchy on processor 100—such as a second or third level data cache. However, higher level cache is not so limited, as it may be associated with or include an instruction cache. A trace cache—a type of instruction cache—instead may be coupled after decoder 125 to store recently decoded traces. Here, an instruction potentially refers to a macro-instruction (i.e. a general instruction recognized by the decoders), which may decode into a number of micro-instructions (micro-operations).

In the depicted configuration, processor 100 also includes on-chip interface module 110. Historically, a memory controller, which is described in more detail below, has been included in a computing system external to processor 100. In this scenario, on-chip interface 11 is to communicate with devices external to processor 100, such as system memory 175, a chipset (often including a memory controller hub to connect to memory 175 and an I/O controller hub to connect peripheral devices), a memory controller hub, a northbridge, or other integrated circuit. And in this scenario, bus 105 may include any known interconnect, such as multi-drop bus, a point-to-point interconnect, a serial interconnect, a parallel bus, a coherent (e.g. cache coherent) bus, a layered protocol architecture, a differential bus, and a GTL bus.

Memory 175 may be dedicated to processor 100 or shared with other devices in a system. Common examples of types of memory 175 include DRAM, SRAM, non-volatile memory (NV memory), and other known storage devices. Note that device 180 may include a graphic accelerator, processor or card coupled to a memory controller hub, data storage coupled to an I/O controller hub, a wireless transceiver, a flash device, an audio controller, a network controller, or other known device.

Recently however, as more logic and devices are being integrated on a single die, such as SOC, each of these devices may be incorporated on processor 100. For example in one embodiment, a memory controller hub is on the same package and/or die with processor 100. Here, a portion of the core (an on-core portion) 110 includes one or more controller(s) for interfacing with other devices such as memory 175 or a graphics device 180. The configuration including an interconnect and controllers for interfacing with such devices is often referred to as an on-core (or un-core configuration). As an example, on-chip interface 110 includes a ring interconnect for on-chip communication and a high-speed serial point-to-point link 105 for off-chip communication. Yet, in the SOC environment, even more devices, such as the network interface, co-processors, memory 175, graphics processor 180, and any other known computer devices/interface may be integrated on a single die or integrated circuit to provide small form factor with high functionality and low power consumption.

In one embodiment, processor 100 is capable of executing a compiler, optimization, and/or translator code 177 to compile, translate, and/or optimize application code 176 to support the apparatus and methods described herein or to interface therewith. A compiler often includes a program or set of programs to translate source text/code into target text/code. Usually, compilation of program/application code with a compiler is done in multiple phases and passes to transform hi-level programming language code into low-level machine or assembly language code. Yet, single pass compilers may still be utilized for simple compilation. A compiler may utilize any known compilation techniques and perform any known compiler operations, such as lexical analysis, preprocessing, parsing, semantic analysis, code generation, code transformation, and code optimization.

Larger compilers often include multiple phases, but most often these phases are included within two general phases: (1) a front-end, i.e. generally where syntactic processing, semantic processing, and some transformation/optimization may take place, and (2) a back-end, i.e. generally where analysis, transformations, optimizations, and code generation takes place. Some compilers refer to a middle, which illustrates the blurring of delineation between a front-end and back end of a compiler. As a result, reference to insertion, association, generation, or other operation of a compiler may take place in any of the aforementioned phases or passes, as well as any other known phases or passes of a compiler. As an illustrative example, a compiler potentially inserts operations, calls, functions, etc. in one or more phases of compilation, such as insertion of calls/operations in a front-end phase of compilation and then transformation of the calls/operations into lower-level code during a transformation phase. Note that during dynamic compilation, compiler code or dynamic optimization code may insert such operations/calls, as well as optimize the code for execution during runtime. As a specific illustrative example, binary code (already compiled code) may be dynamically optimized during runtime. Here, the program code may include the dynamic optimization code, the binary code, or a combination thereof.

Similar to a compiler, a translator, such as a binary translator, translates code either statically or dynamically to optimize and/or translate code. Therefore, reference to execution of code, application code, program code, or other software environment may refer to: (1) execution of a compiler program(s), optimization code optimizer, or translator either dynamically or statically, to compile program code, to maintain software structures, to perform other operations, to optimize code, or to translate code; (2) execution of main program code including operations/calls, such as application code that has been optimized/compiled; (3) execution of other program code, such as libraries, associated with the main program code to maintain software structures, to perform other software related operations, or to optimize code; or (4) a combination thereof.

Reconfiguring capabilities of a computing system architecture can facilitate adaptiveness, robustness, scalability, and reliability for the ever-increasing use cases in current computing and storage industry. The granularity of dynamic reconfigurability for certain interconnect components, however, is restricted to the capabilities advertised by each function during the initial enumeration. Usually, after enumeration, the capability profile for a specific function offered by a connected device is exposed identically for all the logic entities in the PCIe hierarchy.

If an entity is to use that specific function to support a certain exclusive capability, the capability will be visible to other entities, which may cause negative side effects such as driver compatibility issues or configuration conflicts. As a result, this problem can prevent the system from being better optimized in terms of cost and efficiency.

This disclosure describes a mechanism in a host and device to hide or present certain interconnect capability structure(s) within a function based on which requester entity (such as BIOS, firmware, OS, driver, etc.) the function is responding to. This disclosure also describes dynamically changing the visibility of certain interconnect capability structure(s) based on new system preference during system initialization or normal operation.

This disclosure also describes facilitating other optimizations within a single function regarding sharing and/or excluding resources associated to certain capability structure(s).

The mechanisms and techniques described herein are among the differentiators of 2LM over PCI Express (PCIe) interface.

Embodiments herein describe secure TLP-based handshake mechanisms between SoC host and PCIe device. Provide Host the ultimate and hardware-autonomous control of when and which PCIe Capability structure(s) should be present or hidden.

When necessary, a host can dynamically configure the device PCIe capability linked list and the device will take actions to present or hide certain PCIe Capability structure(s).

Advantages of the present disclosure are readily apparent to those of skill in the art. For example, embodiments can fortify two-level memory (2LM)-related systems and other potential computing systems by exploring and managing features associated to vendor-specific critical capability structure(s) (for example, using BIOS) and preventing them from being exposed to irrelevant system hardware/software entities (such as OS or driver), which ensures broader software/driver reusability.

Embodiments provide hardware autonomous (OS, SW, driver agnostic) and/or more system optimizations based on system knowledge owned by host. Embodiments provide fine capability-structure-level granularity, which can be potentially leveraged in building future computing systems for adaptiveness, robustness, scalability and reliability.

Figure 2:
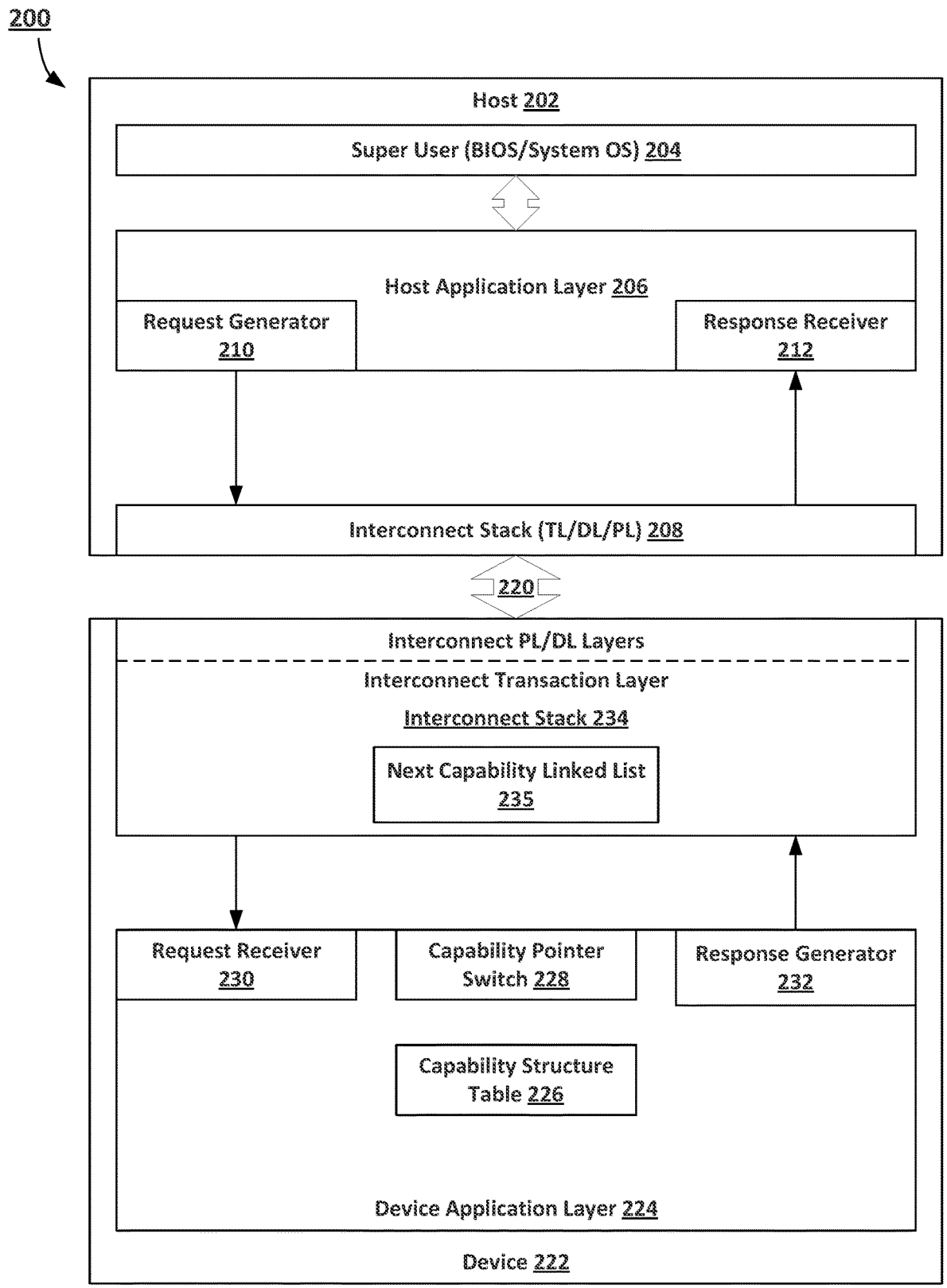
FIG. 2 is a schematic diagram of a system that includes a host connected to a downstream device in accordance with embodiments of the present disclosure.

FIG. 2 is a schematic diagram of a system 200 that includes a host connected to a downstream device in accordance with embodiments of the present disclosure. System 200 can include a host 202. Host 202 can include a core processor and can include a root complex system for interconnecting various connected devices with the host 202. The host 202 can be a system-on-chip design or can be an independent unit, and can be capable of being coupled to other devices across a link 220, such as an interconnect link compliant with a PCIe-based protocol. The host 202 can include an interconnect protocol compatible (e.g., PCIe) root port controller.

The host 202 can include a super user 204. Super user 204 can be used as a term to represent any host system that can administer system operations; for example, super user 204 can include system BIOS, operating systems, firmware, etc.).

The host 202 can include a host application layer 206. The host application layer 206 can include a request generator 210 implemented in hardware, software, or a combination of hardware and software. The request generator 210 can be implemented in the host 202 application layer 206 to compose request messages and present them to standard PCIe Transaction layer in the interconnect stack 208 for transmission across link 220. The request generator 210 can be a component implemented in the host application layer 206 to compose the related transaction layer packets (TLPs) and present them to standard interconnect Transaction layer for transmission. In some embodiments, the request generator 210 can generate vendor-defined messages (VDM), some examples of which are described in more detail below.

The host 202 can also include, in the host application layer 206, a response receiver 212 implemented in hardware, software, or a combination of hardware and software. For example, the response receiver 212 can be a VDM receiver that can receive VDM messages across an interconnect link. The response receiver 212 can parse, interpret, or decipher an incoming response message. In embodiments, the response receiver 212 can determine responses to response messages by parsing the response message and retrieving information in response to the response message (e.g., by accessing appropriate memory locations, tables, databases, functional or logical components, etc.).

The system 200 can include one or more connected devices, such as device 222. Device 222 can include a PCIe Endpoint or a special type of Root Complex Integrated Endpoint (RCiEP)). In embodiments, the RCiEP can be one that leverages PCIe link to communicate with its associated Root Complex, which can be the super user 204. An example is a 2LM memory cache, which is an enhanced RCiEP.

Device 222 can include a device application layer 224. The device application layer 224 can include a request receiver 230 and a response generator 232, which are similar to those described above. The request receiver 230 can receive, parse, interpret, and/or decipher received messages, such as VDM messages. The request receiver 230 can receive the related TLPs from a standard interconnect Transaction layer, parse (and if needed, decipher) the TLPs, and take other steps based on the information in the TLPs. The device 222 can also include a response generator 232 to compose the related TLPs (responses) and present them to standard PCIe Transaction layer for transmission.

The device application layer 224 also includes a component referred to herein as a capability pointer switch 228. The capability pointer switch 228 can be implemented in hardware, software, or a combination of hardware and software. The capability pointer switch 228 can include logic for controlling the content of the Next Capability Offset field value of the related Capability structures (described below). The capability pointer switch 228 can be controlled by the host 202 via the transmitted TLPs.

The device application layer 224 can include a capability structure configuration 226. The capability structure configuration 226 can include a table for the host 202 to probe and configure, with information of the proposed capability structure configuration that the Device supports. The capability structure configuration 226 can be accessed by the host 202 via TLPs. One example of a capability structure table 226 is shown in Table 1.

TABLE 1

Example Capability (Cap) Structure Configuration Table.

| Capability Structure Index (RO to Host) | Requester ID Check Enable (RW) | Valid Requester ID (RW) | Capability Hide Enable (RW) |
|---|---|---|---|
| 16'h0 (All Caps) | 1b | 16'h0000_0000 | 0b |
| 16'0008h (Cap_1:MFVC) | 1b | 16'h0000_0000 | 0b => 1b |
| 16'0017h (Cap_2) | 1b | 16'h0000_0000 | 0b |
| ... | ... | ... | ... |
| 16'hxxxx_xxxx (Cap_N) | 1b | 16'h0000_0000 | 0b |

Figure 3:
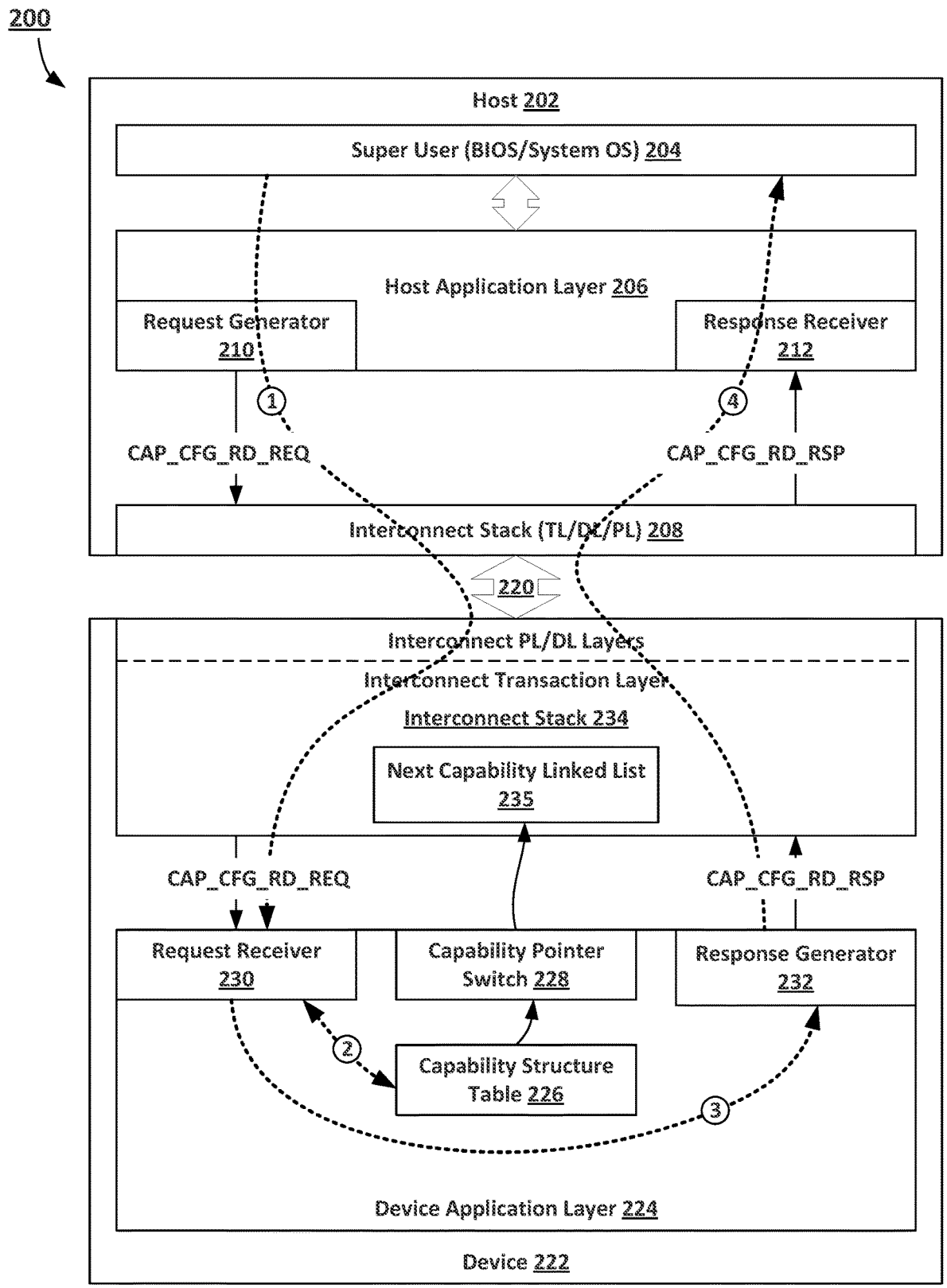
FIG. 3 is a schematic diagram of the system of FIG. 2 illustrating an example of capability structure configuration initialization accordance with embodiments of the present disclosure.
Figure 4:
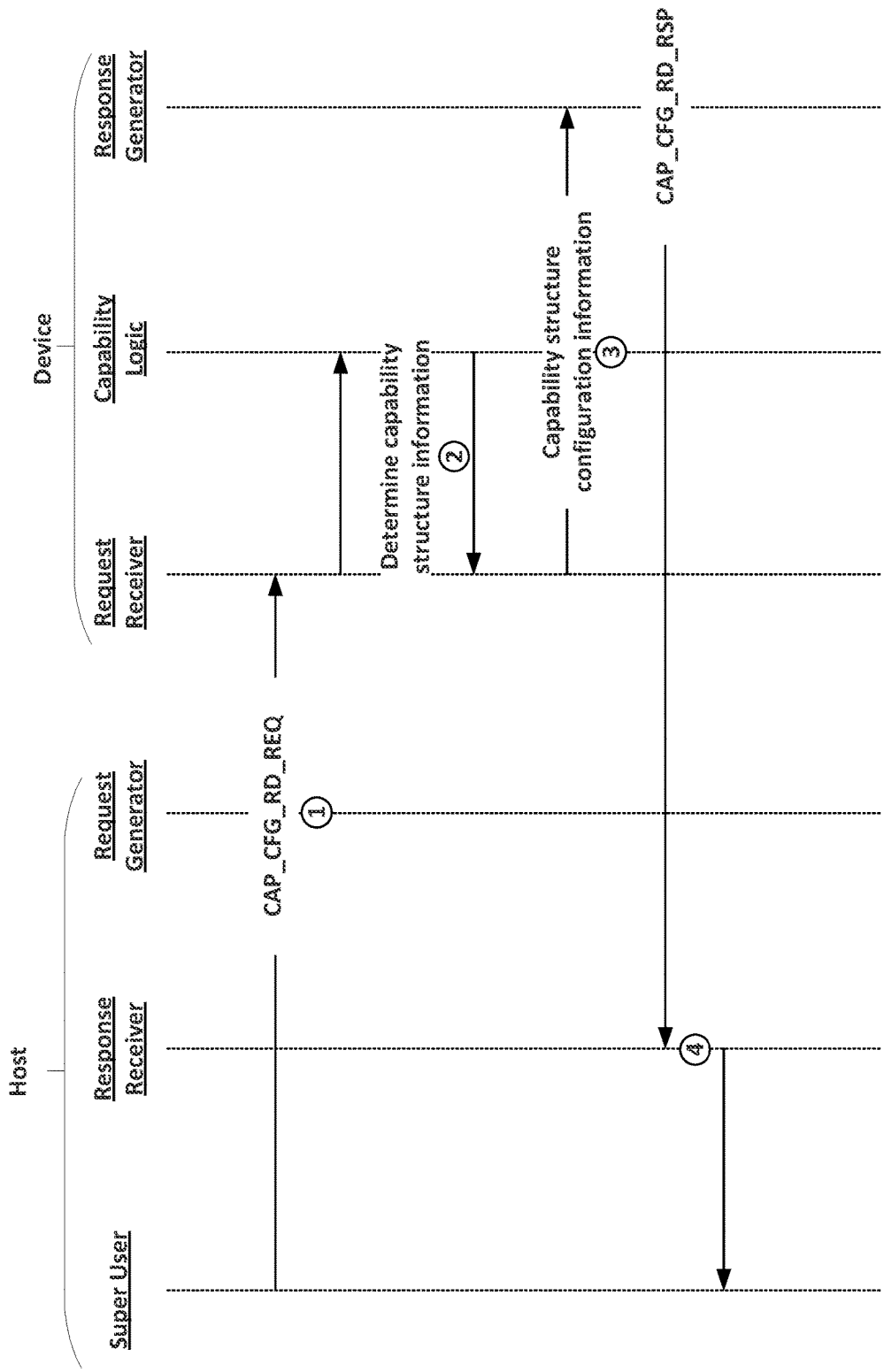
FIG. 4 is a swim lane diagram illustrating an example capability structure configuration initialization in accordance with embodiments of the present disclosure.

FIG. 3 is a schematic diagram of the system of FIG. 2 illustrating an example of capability structure configuration initialization accordance with embodiments of the present disclosure. FIG. 4 is a swim lane diagram illustrating an example capability structure configuration initialization in accordance with embodiments of the present disclosure. FIGS. 3 and 4 can be viewed together.

Figure 7:
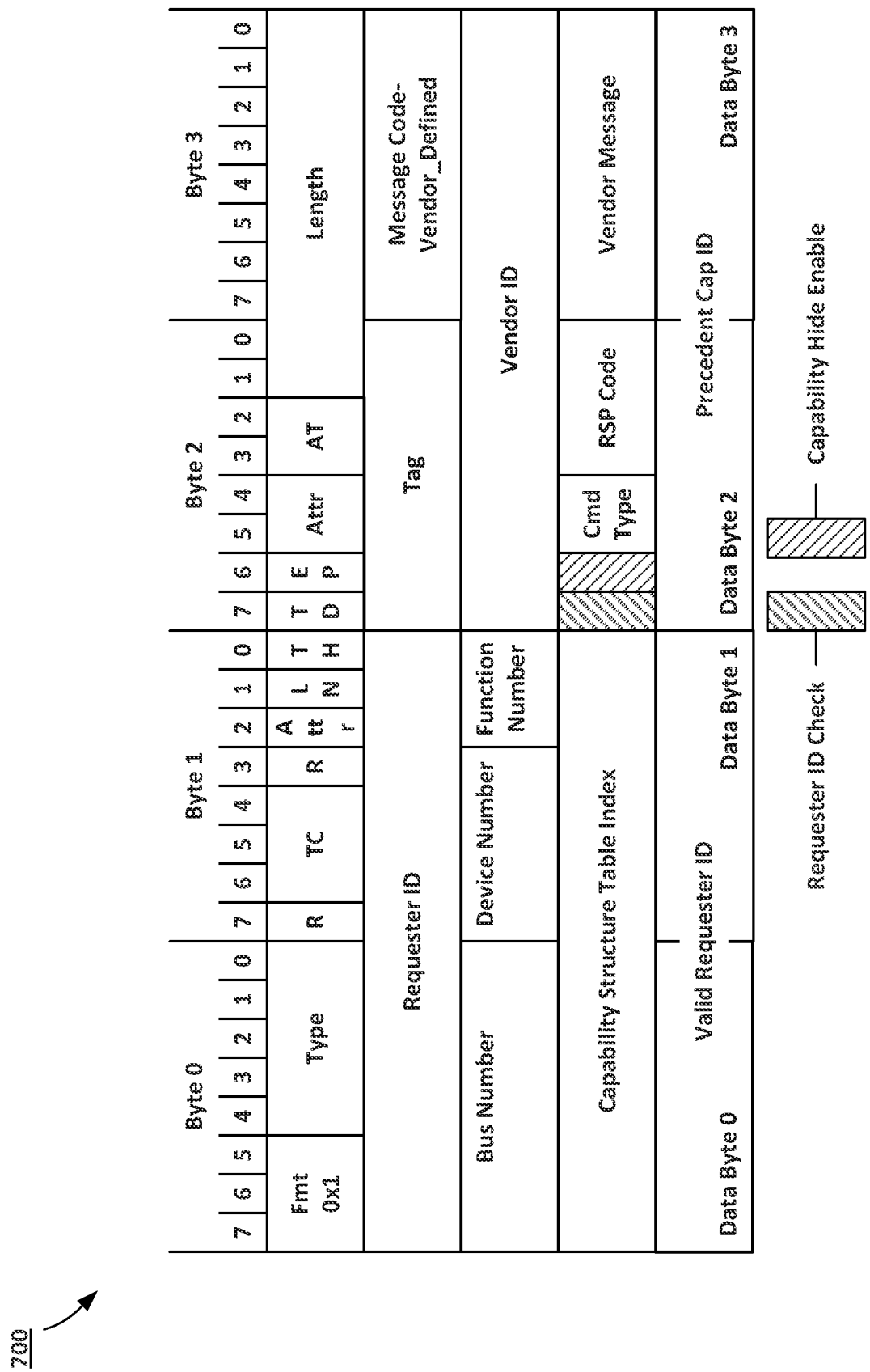
FIG. 7 is a schematic diagram of an example vendor defined message frame in accordance with embodiments of the present disclosure.

To implement the aspects of the embodiments, certain handshake mechanisms are used between the host 202 and device 222 to convey control/status information. Various TLP-based mechanisms can be employed for the handshake, such as Vendor Defined Message (VDM) (FIG. 7 provides an example of a VDM structure), Special Memory Rd/Wr targeting particular Memory-Mapped IO spaces, or Cfg Rd/Wr Requests targeting Vendor-Specific Extended Capability (VSEC) or Designated Vendor-Specific Extended Capability (DVSEC), etc.

The host 202 and device 222 can have an application layer agreement on how capability structure configuration information is packaged via a set of standard TLP packets.

Given the above, several TLPs can be defined to facilitate the capability structure configuration initialization process.

There are generally two kinds of host request TLPs; namely:

CAP_CFG_RD_REQ (no payload): used to read the "Capability Structure table"; and

CAP_CFG_WR_REQ (with payload): used to configure the "Capability Structure table."

From the device 222 perspective, several kinds of responses are architected as an example to illustrate the mechanism, namely:

CAP_CFG_RD_RSP (with payload): used to respond to CAP_CFG_RD_REQ with information in "Capability Structure table"; and CAP_CFG_WR_RSP (no payload): used to respond to CAP_CFG_WR_REQ regarding whether the configuration from the host 202 is successful or not (reflected by the "RSP Code" field in FIG. 7).

Given the definition above, FIGS. 3 and 4 illustrate one system example for capability structure configuration initialization. In addition, here is a brief introduction summary of the highlighted blocks:

1) During normal system boot-up, the "Super User" entity 204 (for example, BIOS or firmware) at host 202 starts exploring the additional "capability structure configuration" feature at the device side by composing a CAP_CFG_RD_REQ at Host application layer.

2) The CAP_CFG_RD_REQ is received by device interconnect layers 234, which in turn passes it to the request receiver 230 at application layer 224. The request receiver 230 is preprogrammed with information (based on the agreement discussed above) of CAP_CFG_RD_REQ framing rules, and can extract the capability structure table information from the capability structure configuration 226. As shown in Table 1, there can be N capability structures that can be dynamically present or hidden, each of which is reflected by different capability structure index, as shown in the first column of Table 1. The index can be mapped directly to "Capability ID" or "PCIe Extended Capability ID," shown by example in FIG. 7. In embodiments, the index can be mapped to an arbitrary value for each capability based on predetermined agreement between the host 202 and device 222.

Given that, the "Super User" 204 can choose to configure one or multiple fields of each indexed entry in a way that the device will present or hide certain capabilities, or additionally even based on configuration conditions such as "Valid Requester ID," etc.

The capability structure index field in Table 1 is read-only from the host perspective but can be configurable by Device firmware. Also, note that Table 1 is just one example of a capability structure configuration table, and the techniques described herein are not limited to the associated fields enumerated in Table 1 for implementation.

3) The device 222 passes the default capability structure configuration information to the response generator 232. The response generator 232 constructs a CAP_CFG_RD_RSP TLP carrying the information with optional encryptions as a completion message in response to the CAP_CFG_RD_REQ.

4) The CAP_CFG_RD_RSP traverses across the PCIe link and layers, and arrives at the response receiver 212 at the host application layer 206. Then the host application layer 206 can transmit the acknowledged information to the "Super User" 204, which concludes the initialization process.

In some embodiments, the host 202 can be preprogrammed to have knowledge of the device's capability structure table 226. In such circumstances, configuration initialization process outlined by the text accompanying FIGS. 3 and 4 would be optional. For example, during enumeration, the "Subsystem Vendor ID Register" of the PCIe Device can be comprehended by Host 202 as a way to identify the Device's capabilities to support the dynamic presentation or hiding of capabilities.

Figure 5:
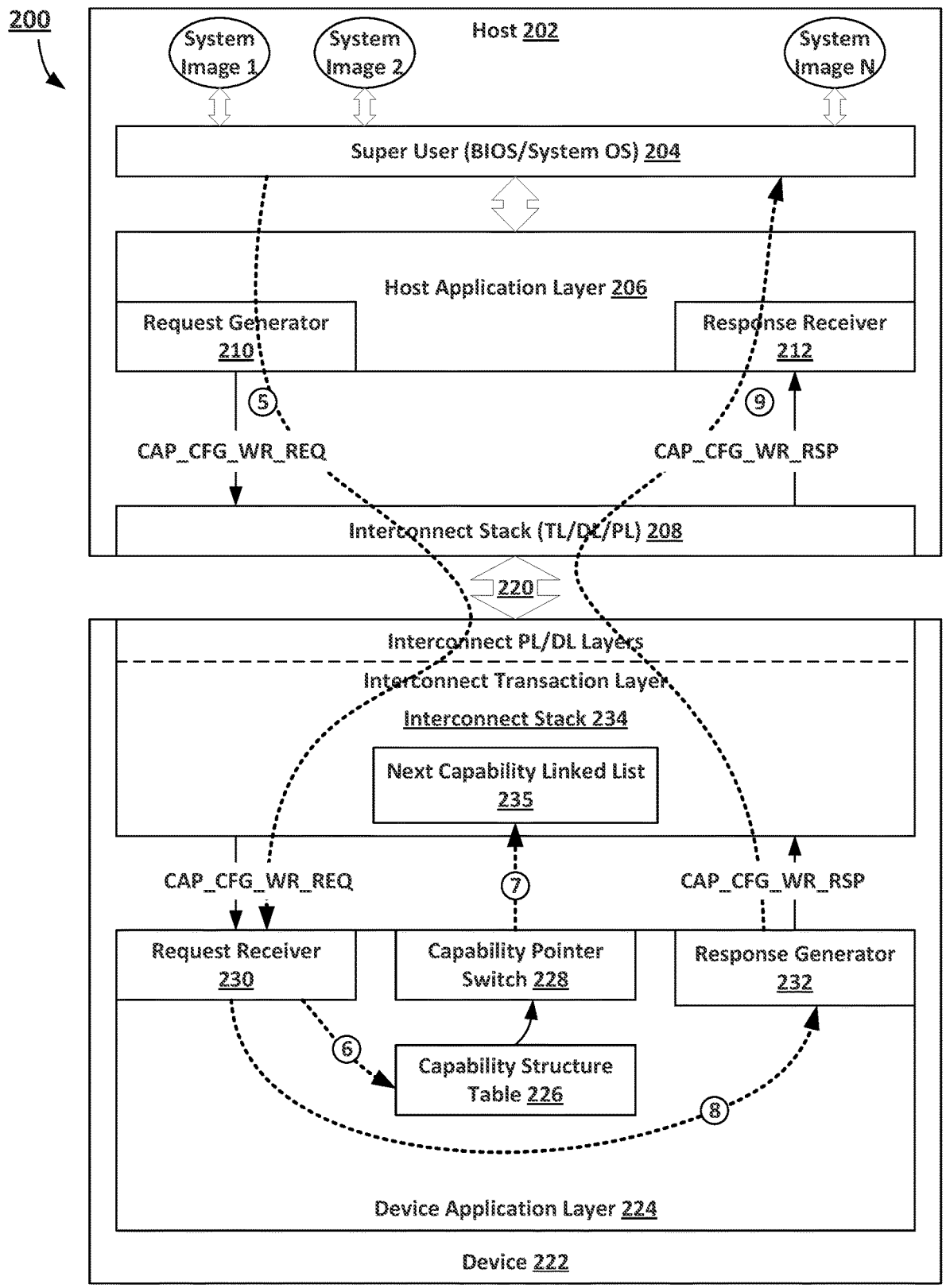
FIG. 5 is a schematic diagram of the system of FIG. 2 illustrating an example of capability structure configuration in accordance with embodiments of the present disclosure.

FIG. 5 is a schematic diagram of the system of FIG. 2 illustrating an example of capability structure configuration in accordance with embodiments of the present disclosure.

Figure 6:
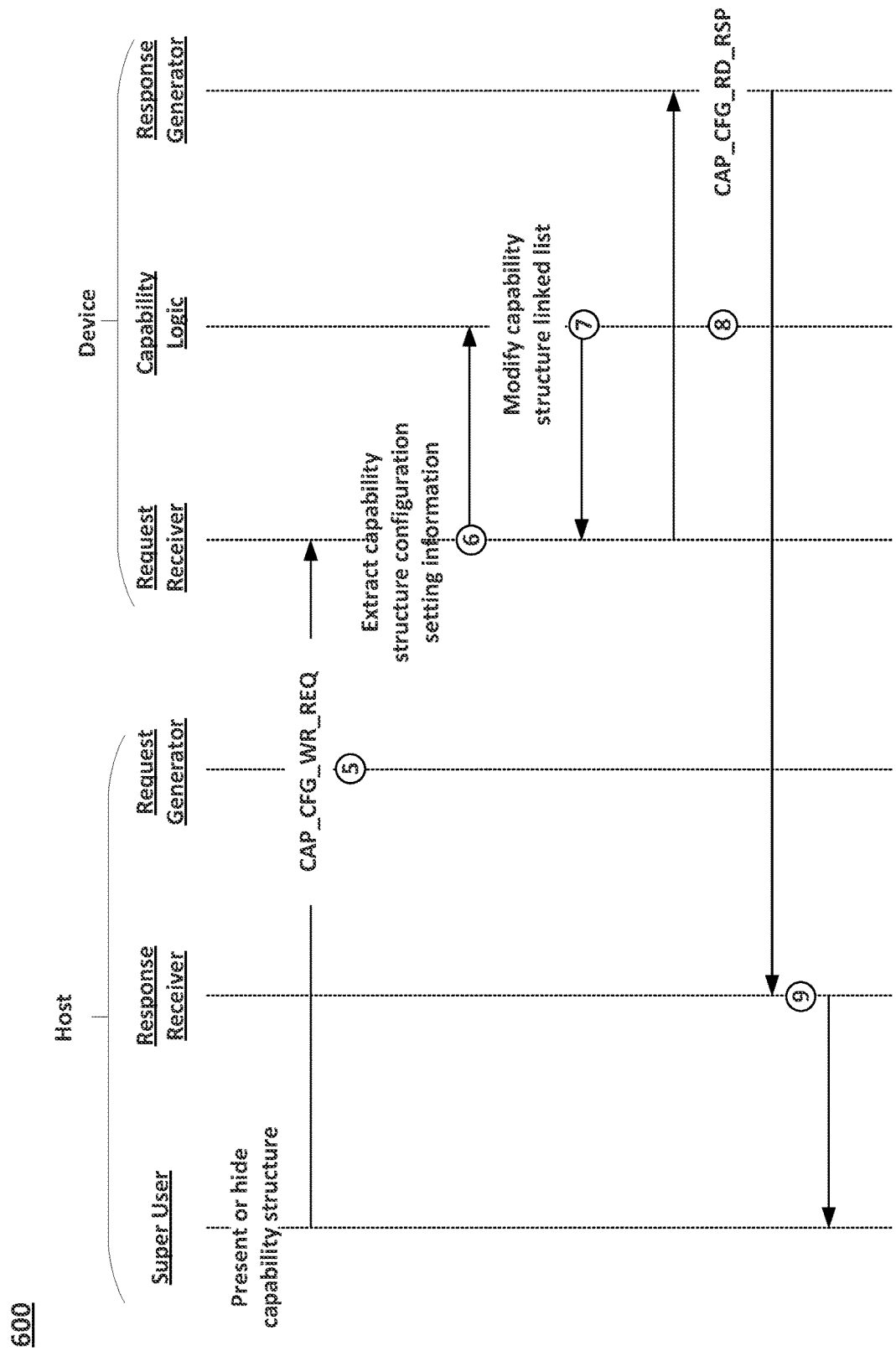
FIG. 6 is a swim lane diagram illustrating an example capability structure configuration procedure in accordance with embodiments of the present disclosure.

FIG. 6 is a swim lane diagram illustrating an example capability structure configuration procedure in accordance with embodiments of the present disclosure. FIGS. 5 and 6 can be viewed together.

5) During normal operation, the Host "Super User" 204 determines that there is a need or desire to present or hide certain capability structures of the device 222 for certain host entity or entities (such as a System Image or a CPU core). Based on that determination, the host request generator 210 can compose a CAP_CFG_WR_REQ TLP at host application layer 206 as a "Capability structure configuration request" with the configuration information targeting the particular capability structure. Based on the Table 1 example, the new setting for those RW fields can be conveyed via the respective fields of the example VDM TLP frame shown in FIG. 7 as a VDM-based TLP example, whether encrypted (if necessary) or not.

6) The CAP_CFG_WR_REQ carrying the configuration information is received by Device PCIe layers 234, which in turn passes it to the request receiver 230 at application layer 224. The request receiver 230 can be preconfigured to contain or have access to information (based on the agreement) of CAP_CFG_WR_REQ framing rules, and decodes the TLP to extract the "Capability structure configuration" setting information. By way of example, a Host "Super User" 204 can choose to configure the "Multi-Function Virtual Channel (MFVC) Extended Capability," which is mapped to the second index entry in Table 1 (with index being the Extended Capability ID as 16'h0008). The Host "Super User" 204 can choose to hide this capability structure from all the requesters whose Requester ID is not all-zero, by setting "Capability hide enable" field to "1b." This example shows how the request receiver can decode the TLP using the capability structure configuration table 226.

7) The updated host setting in the "Capability Structure Table" drives the "Capability pointer switch" 228 to modify the capability structure linked list 235 within the device 222 in a way that the MFVC Capability structure is not chained via the "Next Capability Offset" into the capability structure linked list 235.

The method of how to add/remove capability structure to/from the linked list is implementation specific. Nevertheless, one example is to update the "Next Capability Pointer/Offset" field in the linked list (shown in FIG. 8B).

8) The request receiver 230 notifies the response generator 232 in the Device application layer 224 to construct a CAP_CFG_WR_RSP with optional encryptions as a completion message in response to the CAP_CFG_WR_REQ.

9) The CAP_CFG_WR_RSP traverses across the interconnect link 220 and layers and arrives at the response receiver 212 at the host application layer 206. Then the host application layer 206 can transmit the acknowledge information to BIOS or System OS, which concludes the capability structure configuration process.

Following the above steps, the device 222 may operate as normal. When, for example, "System Image 1" (with Requester ID as not all-zero) in FIG. 5 issues a capability exploration or enumeration upon the device 222, the device 222 can present "System Image 1" a linked list that does not include the MFVC Capability structure (continuing the above example). This way, the MFVC Capability structure is hidden from System Image 1. If in case "System Image 1" chose to ignore the linked list it explored and issued Configuration Request "directly" targeting the MFVC Capability structure (Extended Capability ID as 16'h0008), the device 222 can validate the request using the Requester ID check per Table 1 setting example, and respond with Unsupported Request (UR) Completion to "System image 1."

Note that the example of hiding MFVC Capability structure has some real use case in 2LM-related architecture, since certain Virtual Channel resource can be dedicated only for certain BIOS-granted logic entities in the Host 202, and hiding the MFVC Capability structure from the irrelevant entities in the Host, such as NVMe Driver, will keep the compatibility from NVMe Driver point of view, which allows the device 222 to flexibly support both 2LM and non-2LM systems.

The forgoing can be a secure mechanism for dynamically hiding or presenting capabilities by introducing information encryption/decryption at application layers so that all the configuration information at the physical PCIe link/lanes can be encrypted.

In addition, the forgoing can improve system efficiency e.g., when multiple capability structures in one or more functions need to be changed. For example, one or more capability structure configuration table(s) can be implemented at the device application layer based on the agreement knowledge from the host. This way, the TLPs used in FIG. 5 may carry information as simple as a configuration "mode" selection. When the device receives the "mode" configuration, it can make changes to all the related capability structures in the device based on the Host Super User's choice of "mode." In addition, this method is very secure by means of hiding all the configuration information from the physical PCIe link/lanes.

In embodiments, a lane can include a set of differential pairs of electrical signal conductors. One pair of electrical signal conductors can be used for transmission and one pair of electrical signal conductors can be used for reception. A by-N link includes N lanes.

FIG. 7 is a schematic diagram of an example vendor defined message frame 700 in accordance with embodiments of the present disclosure. Based on PCIe Vendor Defined Message (VDM) definition, an example of VDM formats is shown in FIG. 7. "Vendor Message" byte field defines the detail type of command Request or Response associated to each and every VDM. Depending on whether each type needs data payload associated, the last Double-word (Data Byte0-3) may or may not be associated to the VDM, hence the "Length" field value may vary between 1 (1DW data payload) and 0 (reserved value as no payload). Note that this is just one example of the VDM format definition, and the proposed idea is by no means limited by this specific VDM format definition.

Figure 8A:
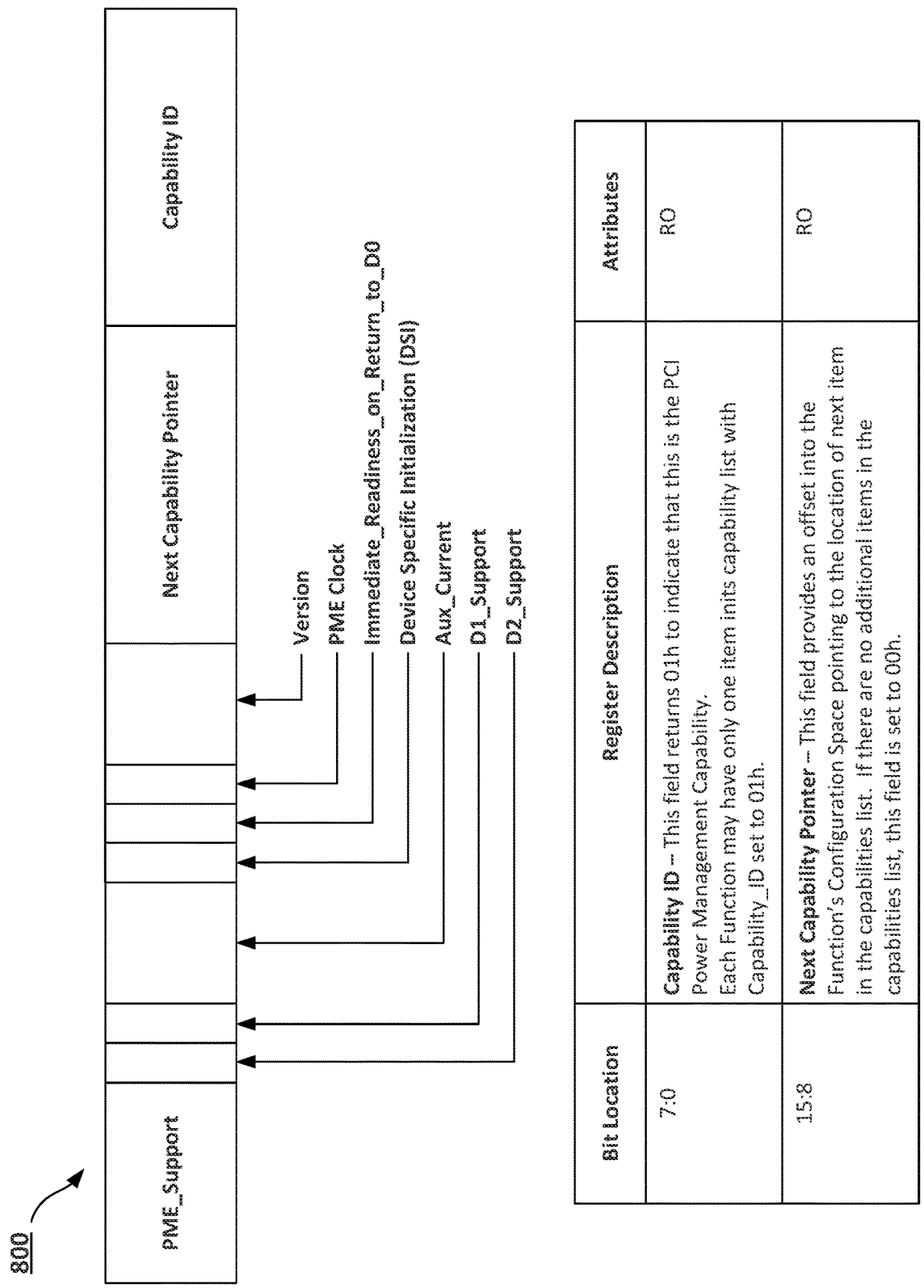
FIG. 8A is an example interconnect protocol-based definition of a next capability pointer and capability identifier as part of a Power Management Capabilities Register in accordance with embodiments of the present disclosure.

FIG. 8A is an example interconnect protocol-based definition of a next capability pointer and capability identifier as part of a Power Management Capabilities Register 800 in accordance with embodiments of the present disclosure. The bit[31:16] may vary between different capability structures, while the "Next Capability Pointer" and "Capability ID" field structures remain the same. A definition of Capability ID and Next Capability Pointer (from PCI Express Base Specification Revision 4.0 Version 1.0):

As part of the Capability Header in each PCIe Capability Structure, "Next Capability Pointer" field contains the offset to the next PCI Capability structure or 00h if no other items exist in the linked list of Capabilities.

Similarly, an exclusive "Capability ID" is included in each and every PCIe Capability structure Header to indicate which particular Capability this structure is.

Figure 8B:
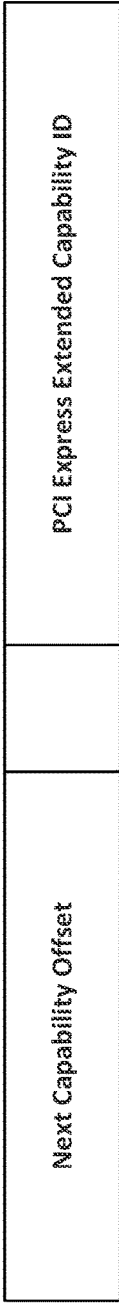
FIG. 8B is an example interconnect protocol-based definition of extended capability header and next capability offset fields in a capability linked list in accordance with embodiments of the present disclosure.

FIG. 8B is an example interconnect protocol-based definition of extended capability header and next capability offset fields in a capability linked list 850 in accordance with embodiments of the present disclosure. The linked list fields provide a definition of an Extended Capability ID and a Next Capability Offset (from PCI Express Base Specification Revision 4.0 Version 1.0). Note that for PCIe Extended Capability structures, the Extended Capability ID is 16-bit instead. Also, the term "Next Capability Offset" is used in this example, but "Next Capability Pointer" can also be used for the same purpose.

One interconnect fabric architecture includes the Peripheral Component Interconnect (PCI) Express (PCIe) architecture. A goal of PCIe is to enable components and devices from different vendors to inter-operate in an open architecture, spanning multiple market segments; Clients (Desktops and Mobile), Servers (Standard and Enterprise), and Embedded and Communication devices. PCI Express is a high performance, general purpose I/O interconnect defined for a wide variety of future computing and communication platforms. Some PCI attributes, such as its usage model, load-store architecture, and software interfaces, have been maintained through its revisions, whereas previous parallel bus implementations have been replaced by a highly scalable, fully serial interface. The more recent versions of PCI Express take advantage of advances in point-to-point interconnects, Switch-based technology, and packetized protocol to deliver new levels of performance and features. Power Management, Quality Of Service (QoS), Hot-Plug/Hot-Swap support, Data Integrity, and Error Handling are among some of the advanced features supported by PCI Express.

Figure 9:
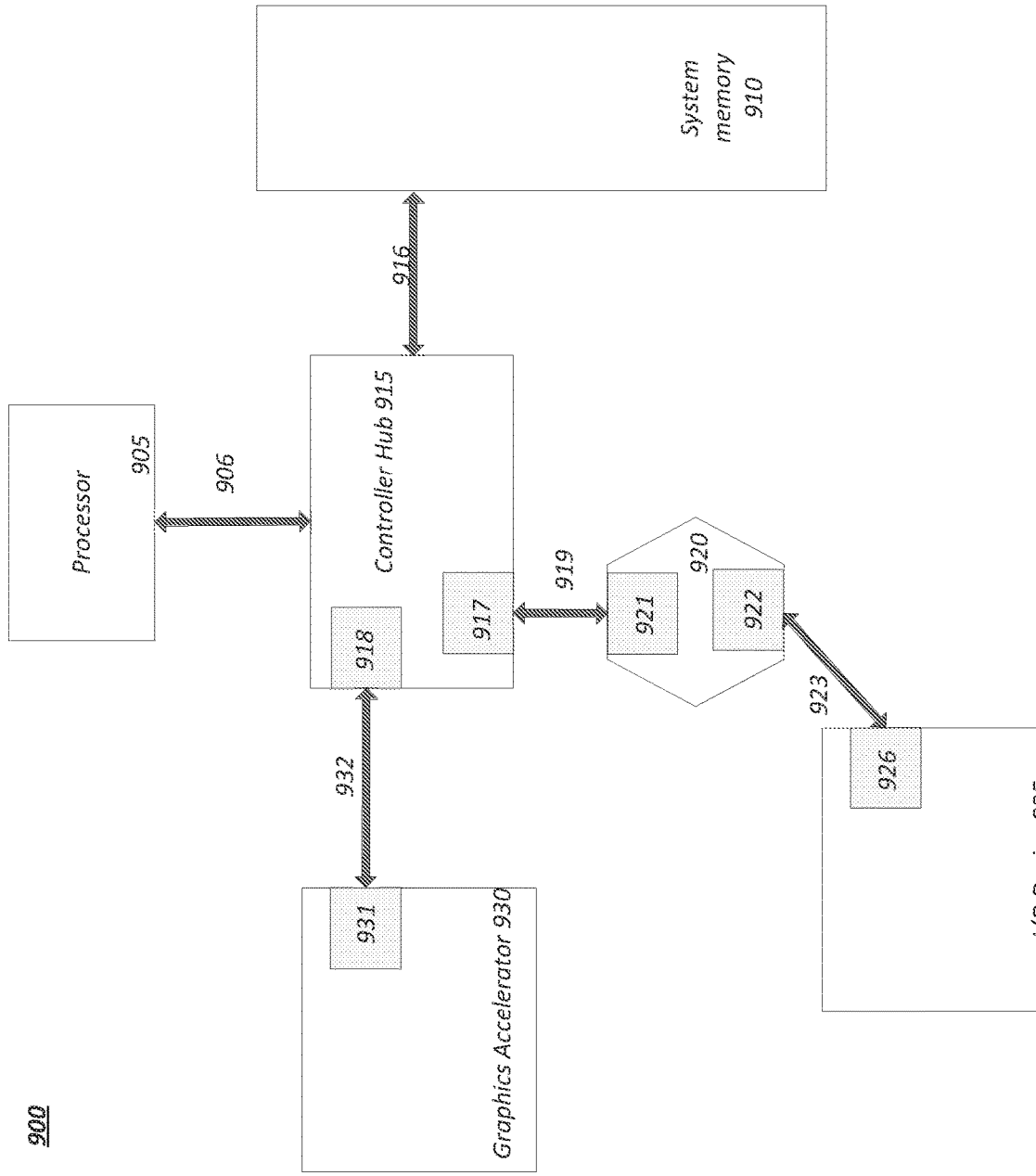
FIG. 9 illustrates an embodiment of a computing system including an interconnect architecture.

Referring to FIG. 9, an embodiment of a fabric composed of point-to-point Links that interconnect a set of components is illustrated. System 900 includes processor 905 and system memory 910 coupled to controller hub 915. Processor 905 includes any processing element, such as a microprocessor, a host processor, an embedded processor, a co-processor, or other processor. Processor 905 is coupled to controller hub 915 through front-side bus (FSB) 906. In one embodiment, FSB 906 is a serial point-to-point interconnect as described below. In another embodiment, link 906 includes a serial, differential interconnect architecture that is compliant with different interconnect standard.

System memory 910 includes any memory device, such as random access memory (RAM), non-volatile (NV) memory, or other memory accessible by devices in system 900. System memory 910 is coupled to controller hub 915 through memory interface 916. Examples of a memory interface include a double-data rate (DDR) memory interface, a dual-channel DDR memory interface, and a dynamic RAM (DRAM) memory interface.

In one embodiment, controller hub 915 is a root hub, root complex, or root controller in a Peripheral Component Interconnect Express (PCIe or PCIE) interconnection hierarchy. Examples of controller hub 915 include a chipset, a memory controller hub (MCH), a northbridge, an interconnect controller hub (ICH) a southbridge, and a root controller/hub. Often the term chipset refers to two physically separate controller hubs, i.e. a memory controller hub (MCH) coupled to an interconnect controller hub (ICH). Note that current systems often include the MCH integrated with processor 905, while controller 915 is to communicate with I/O devices, in a similar manner as described below. In some embodiments, peer-to-peer routing is optionally supported through root complex 915.

Here, controller hub 915 is coupled to switch/bridge 920 through serial link 919. Input/output modules 917 and 921, which may also be referred to as interfaces/ports 917 and 921, include/implement a layered protocol stack to provide communication between controller hub 915 and switch 920. In one embodiment, multiple devices are capable of being coupled to switch 920.

Switch/bridge 920 routes packets/messages from device 925 upstream, i.e. up a hierarchy towards a root complex, to controller hub 915 and downstream, i.e. down a hierarchy away from a root controller, from processor 905 or system memory 910 to device 925. Switch 920, in one embodiment, is referred to as a logical assembly of multiple virtual PCI-to-PCI bridge devices. Device 925 includes any internal or external device or component to be coupled to an electronic system, such as an I/O device, a Network Interface Controller (NIC), an add-in card, an audio processor, a network processor, a hard-drive, a storage device, a CD/DVD ROM, a monitor, a printer, a mouse, a keyboard, a router, a portable storage device, a Firewire device, a Universal Serial Bus (USB) device, a scanner, and other input/output devices. Often in the PCIe vernacular, such as device, is referred to as an endpoint. Although not specifically shown, device 925 may include a PCIe to PCI/PCI-X bridge to support legacy or other version PCI devices. Endpoint devices in PCIe are often classified as legacy, PCIe, or root complex integrated endpoints.

Graphics accelerator 930 is also coupled to controller hub 915 through serial link 932. In one embodiment, graphics accelerator 930 is coupled to an MCH, which is coupled to an ICH. Switch 920, and accordingly I/O device 925, is then coupled to the ICH. I/O modules 931 and 918 are also to implement a layered protocol stack to communicate between graphics accelerator 930 and controller hub 915. Similar to the MCH discussion above, a graphics controller or the graphics accelerator 930 itself may be integrated in processor 905.

Figure 10:
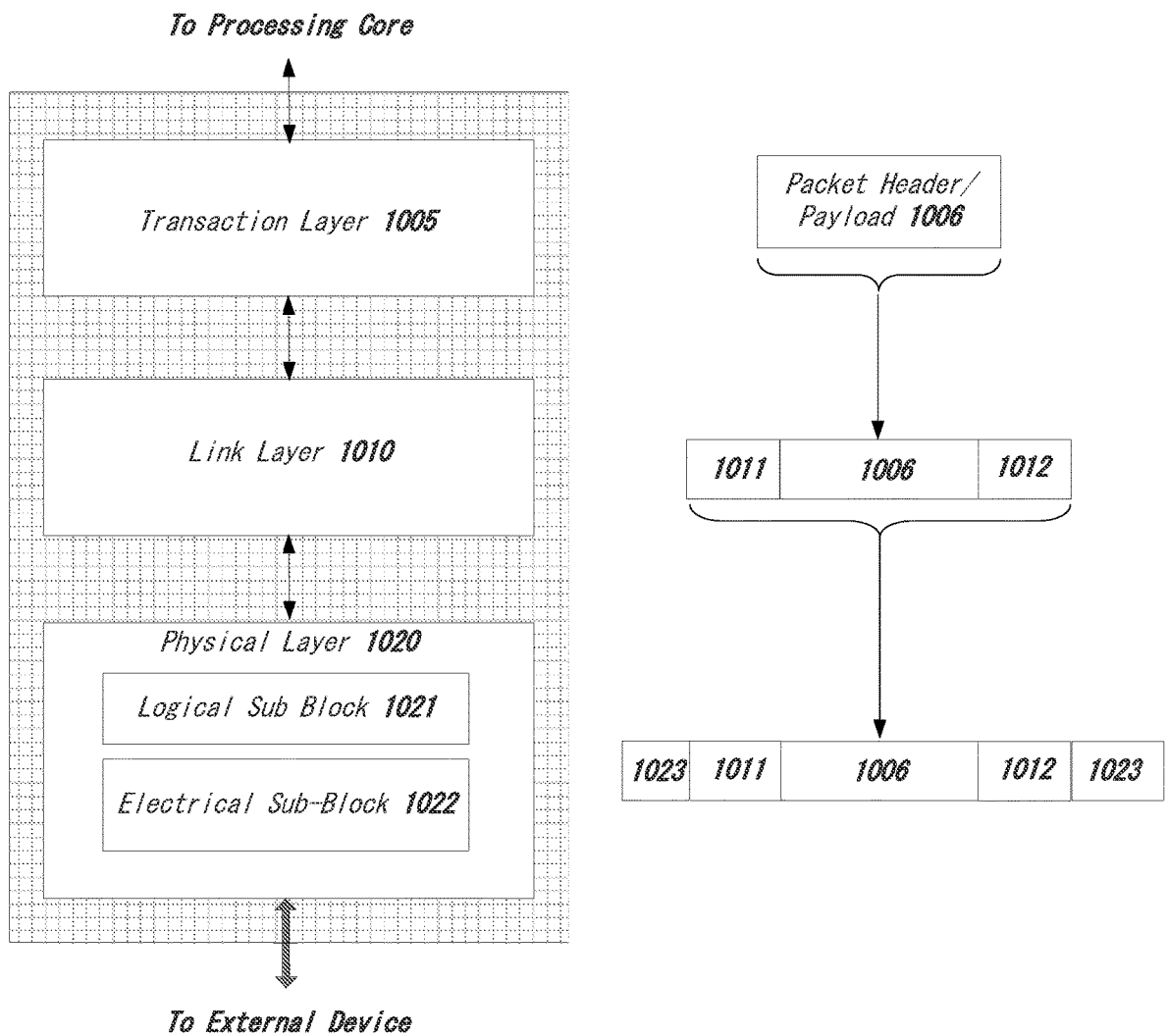
FIG. 10 illustrates an embodiment of a interconnect architecture including a layered stack.

Turning to FIG. 10 an embodiment of a layered protocol stack is illustrated. Layered protocol stack 1000 includes any form of a layered communication stack, such as a Quick Path Interconnect (QPI) stack, a PCie stack, a next generation high performance computing interconnect stack, or other layered stack. Although the discussion immediately below in reference to FIGS. 9-12 are in relation to a PCIe stack, the same concepts may be applied to other interconnect stacks. In one embodiment, protocol stack 1000 is a PCIe protocol stack including transaction layer 1005, link layer 1010, and physical layer 1020. An interface, such as interfaces 917, 918, 921, 922, 926, and 931 in FIG. 1, may be represented as communication protocol stack 1000. Representation as a communication protocol stack may also be referred to as a module or interface implementing/including a protocol stack.

PCI Express uses packets to communicate information between components. Packets are formed in the Transaction Layer 1005 and Data Link Layer 1010 to carry the information from the transmitting component to the receiving component. As the transmitted packets flow through the other layers, they are extended with additional information necessary to handle packets at those layers. At the receiving side the reverse process occurs and packets get transformed from their Physical Layer 1020 representation to the Data Link Layer 1010 representation and finally (for Transaction Layer Packets) to the form that can be processed by the Transaction Layer 1005 of the receiving device.

Transaction Layer

In one embodiment, transaction layer 1005 is to provide an interface between a device's processing core and the interconnect architecture, such as data link layer 1010 and physical layer 1020. In this regard, a primary responsibility of the transaction layer 1005 is the assembly and disassembly of packets (i.e., transaction layer packets, or TLPs). The translation layer 1005 typically manages credit-base flow control for TLPs. PCIe implements split transactions, i.e. transactions with request and response separated by time, allowing a link to carry other traffic while the target device gathers data for the response.

In addition PCIe utilizes credit-based flow control. In this scheme, a device advertises an initial amount of credit for each of the receive buffers in Transaction Layer 1005. An external device at the opposite end of the link, such as controller hub 115 in FIG. 1, counts the number of credits consumed by each TLP. A transaction may be transmitted if the transaction does not exceed a credit limit. Upon receiving a response an amount of credit is restored. An advantage of a credit scheme is that the latency of credit return does not affect performance, provided that the credit limit is not encountered.

In one embodiment, four transaction address spaces include a configuration address space, a memory address space, an input/output address space, and a message address space. Memory space transactions include one or more of read requests and write requests to transfer data to/from a memory-mapped location. In one embodiment, memory space transactions are capable of using two different address formats, e.g., a short address format, such as a 32-bit address, or a long address format, such as 64-bit address. Configuration space transactions are used to access configuration space of the PCIe devices. Transactions to the configuration space include read requests and write requests. Message space transactions (or, simply messages) are defined to support in-band communication between PCIe agents.

Therefore, in one embodiment, transaction layer 1005 assembles packet header/payload 1006. Format for current packet headers/payloads may be found in the PCIe specification at the PCIe specification website.

Figure 11:
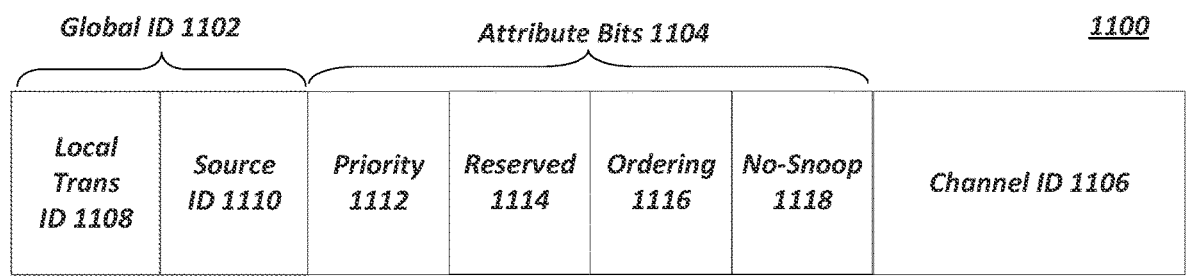
FIG. 11 illustrates an embodiment of a request or packet to be generated or received within an interconnect architecture.

Quickly referring to FIG. 11, an embodiment of a PCIe transaction descriptor is illustrated. In one embodiment, transaction descriptor 1100 is a mechanism for carrying transaction information. In this regard, transaction descriptor 1100 supports identification of transactions in a system. Other potential uses include tracking modifications of default transaction ordering and association of transaction with channels.

Transaction descriptor 1100 includes global identifier field 1102, attributes field 1104 and channel identifier field 1106. In the illustrated example, global identifier field 1102 is depicted comprising local transaction identifier field 1108 and source identifier field 1110. In one embodiment, global transaction identifier 1102 is unique for all outstanding requests.

According to one implementation, local transaction identifier field 1108 is a field generated by a requesting agent, and it is unique for all outstanding requests that require a completion for that requesting agent. Furthermore, in this example, source identifier 1110 uniquely identifies the requestor agent within a PCIe hierarchy. Accordingly, together with source ID 1110, local transaction identifier 1108 field provides global identification of a transaction within a hierarchy domain.

Attributes field 1104 specifies characteristics and relationships of the transaction. In this regard, attributes field 1104 is potentially used to provide additional information that allows modification of the default handling of transactions. In one embodiment, attributes field 1104 includes priority field 1112, reserved field 1114, ordering field 1116, and no-snoop field 1118. Here, priority sub-field 1112 may be modified by an initiator to assign a priority to the transaction. Reserved attribute field 1114 is left reserved for future, or vendor-defined usage. Possible usage models using priority or security attributes may be implemented using the reserved attribute field.

In this example, ordering attribute field 1116 is used to supply optional information conveying the type of ordering that may modify default ordering rules. According to one example implementation, an ordering attribute of "0" denotes default ordering rules are to apply, wherein an ordering attribute of "1" denotes relaxed ordering, wherein writes can pass writes in the same direction, and read completions can pass writes in the same direction. Snoop attribute field 1118 is utilized to determine if transactions are snooped. As shown, channel ID Field 1106 identifies a channel that a transaction is associated with.

Link Layer

Link layer 1010, also referred to as data link layer 1010, acts as an intermediate stage between transaction layer 1005 and the physical layer 1020. In one embodiment, a responsibility of the data link layer 1010 is providing a reliable mechanism for exchanging Transaction Layer Packets (TLPs) between two components a link. One side of the Data Link Layer 1010 accepts TLPs assembled by the Transaction Layer 1005, applies packet sequence identifier 1011, i.e. an identification number or packet number, calculates and applies an error detection code, i.e. CRC 1012, and submits the modified TLPs to the Physical Layer 1020 for transmission across a physical to an external device.

Physical Layer

In one embodiment, physical layer 1020 includes logical sub block 1021 and electrical sub-block 1022 to physically transmit a packet to an external device. Here, logical sub-block 1021 is responsible for the "digital" functions of Physical Layer 1021. In this regard, the logical sub-block includes a transmit section to prepare outgoing information for transmission by physical sub-block 1022, and a receiver section to identify and prepare received information before passing it to the Link Layer 1010.

Physical block 1022 includes a transmitter and a receiver. The transmitter is supplied by logical sub-block 1021 with symbols, which the transmitter serializes and transmits onto to an external device. The receiver is supplied with serialized symbols from an external device and transforms the received signals into a bit-stream. The bit-stream is de-serialized and supplied to logical sub-block 1021. In one embodiment, an 8b/10b transmission code is employed, where ten-bit symbols are transmitted/received. Here, special symbols are used to frame a packet with frames 1023. In addition, in one example, the receiver also provides a symbol clock recovered from the incoming serial stream.

As stated above, although transaction layer 1005, link layer 1010, and physical layer 1020 are discussed in reference to a specific embodiment of a PCIe protocol stack, a layered protocol stack is not so limited. In fact, any layered protocol may be included/implemented. As an example, an port/interface that is represented as a layered protocol includes: (1) a first layer to assemble packets, i.e. a transaction layer; a second layer to sequence packets, i.e. a link layer; and a third layer to transmit the packets, i.e. a physical layer. As a specific example, a common standard interface (CSI) layered protocol is utilized.

Figure 12:
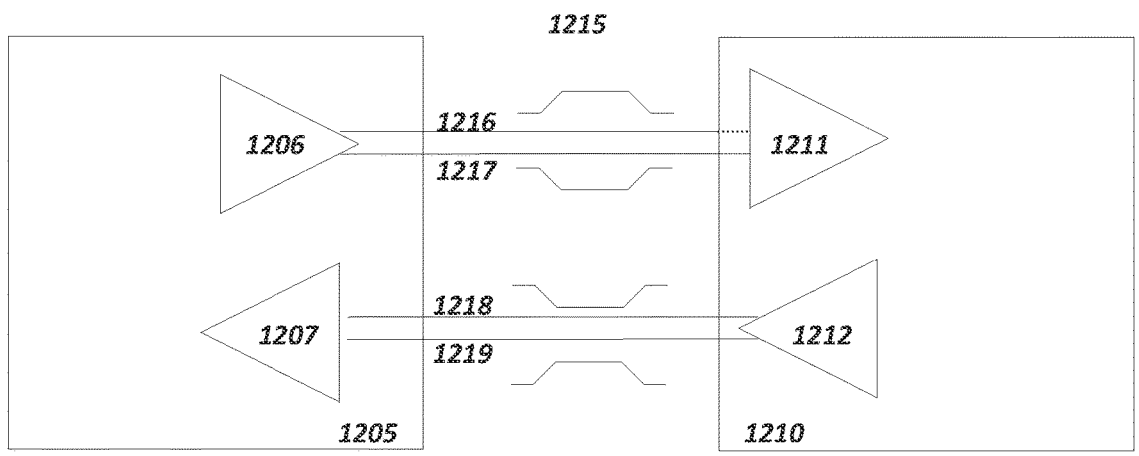
FIG. 12 illustrates an embodiment of a transmitter and receiver pair for an interconnect architecture.

Referring next to FIG. 12, an embodiment of a PCIe serial point to point fabric is illustrated. Although an embodiment of a PCIe serial point-to-point link is illustrated, a serial point-to-point link is not so limited, as it includes any transmission path for transmitting serial data. In the embodiment shown, a basic PCIe link includes two, low-voltage, differentially driven signal pairs: a transmit pair 1206/1211 and a receive pair 1212/1207. Accordingly, device 1205 includes transmission logic 1206 to transmit data to device 1210 and receiving logic 1207 to receive data from device 1210. In other words, two transmitting paths, i.e. paths 1216 and 1217, and two receiving paths, i.e. paths 1218 and 1219, are included in a PCIe link.

A transmission path refers to any path for transmitting data, such as a transmission line, a copper line, an optical line, a wireless communication channel, an infrared communication link, or other communication path. A connection between two devices, such as device 1205 and device 1210, is referred to as a link, such as link 415. A link may support one lane—each lane representing a set of differential signal pairs (one pair for transmission, one pair for reception). To scale bandwidth, a link may aggregate multiple lanes denoted by xN, where N is any supported Link width, such as 1, 2, 4, 8, 12, 16, 32, 64, or wider.

A differential pair refers to two transmission paths, such as lines 416 and 417, to transmit differential signals. As an example, when line 416 toggles from a low voltage level to a high voltage level, i.e. a rising edge, line 417 drives from a high logic level to a low logic level, i.e. a falling edge. Differential signals potentially demonstrate better electrical characteristics, such as better signal integrity, i.e. cross-coupling, voltage overshoot/undershoot, ringing, etc. This allows for better timing window, which enables faster transmission frequencies.

Figure 13:
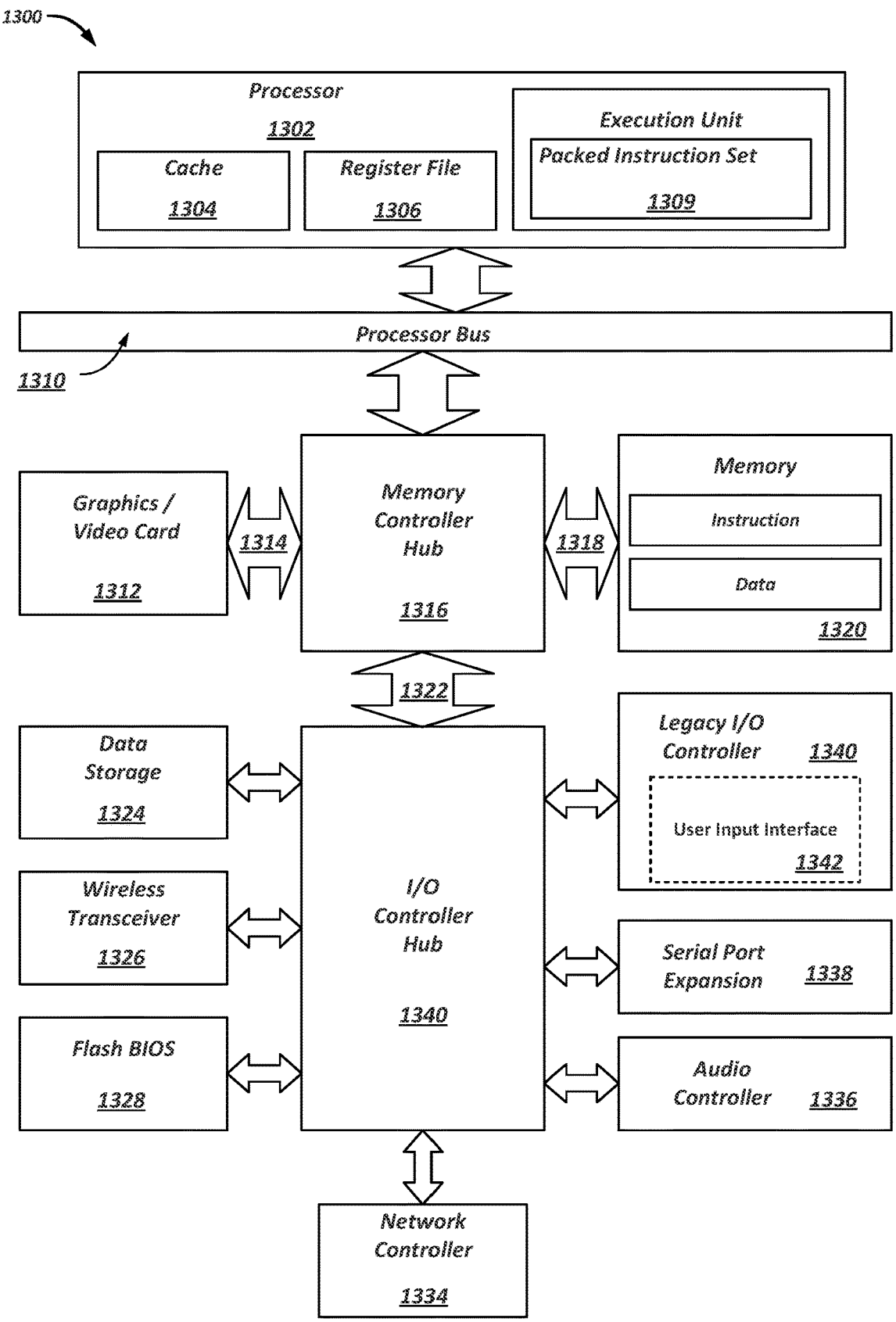
FIG. 13 illustrates another embodiment of a block diagram for a computing system including a processor.

Turning to FIG. 13, a block diagram of an exemplary computer system formed with a processor that includes execution units to execute an instruction, where one or more of the interconnects implement one or more features in accordance with one embodiment of the present disclosure is illustrated. System 1300 includes a component, such as a processor 1302 to employ execution units including logic to perform algorithms for process data, in accordance with the present disclosure, such as in the embodiment described herein. System 1300 is representative of processing systems based on the PENTIUM III™, PENTIUM 4™, Xeon™, Itanium, XScale™ and/or StrongARM™ microprocessors available from Intel Corporation of Santa Clara, Calif., although other systems (including PCs having other microprocessors, engineering workstations, set-top boxes and the like) may also be used. In one embodiment, sample system 1300 executes a version of the WINDOWS™ operating system available from Microsoft Corporation of Redmond, Wash., although other operating systems (UNIX and Linux for example), embedded software, and/or graphical user interfaces, may also be used. Thus, embodiments of the present disclosure are not limited to any specific combination of hardware circuitry and software.

Embodiments are not limited to computer systems. Alternative embodiments of the present disclosure can be used in other devices such as handheld devices and embedded applications. Some examples of handheld devices include cellular phones, Internet Protocol devices, digital cameras, personal digital assistants (PDAs), and handheld PCs. Embedded applications can include a micro controller, a digital signal processor (DSP), system on a chip, network computers (NetPC), set-top boxes, network hubs, wide area network (WAN) switches, or any other system that can perform one or more instructions in accordance with at least one embodiment.

In this illustrated embodiment, processor 1302 includes one or more execution units 1308 to implement an algorithm that is to perform at least one instruction. One embodiment may be described in the context of a single processor desktop or server system, but alternative embodiments may be included in a multiprocessor system. System 1300 is an example of a 'hub' system architecture. The computer system 1300 includes a processor 1302 to process data signals. The processor 1302, as one illustrative example, includes a complex instruction set computer (CISC) microprocessor, a reduced instruction set computing (RISC) microprocessor, a very long instruction word (VLIW) microprocessor, a processor implementing a combination of instruction sets, or any other processor device, such as a digital signal processor, for example. The processor 1302 is coupled to a processor bus 1310 that transmits data signals between the processor 1302 and other components in the system 1300. The elements of system 1300 (e.g. graphics accelerator 1312, memory controller hub 1316, memory 1320, I/O controller hub 1324, wireless transceiver 1326, Flash BIOS 1328, Network controller 1334, Audio controller 1336, Serial expansion port 1338, I/O controller 1340, etc.) perform their conventional functions that are well known to those familiar with the art.

In one embodiment, the processor 1302 includes a Level 1 (L1) internal cache memory 1304. Depending on the architecture, the processor 1302 may have a single internal cache or multiple levels of internal caches. Other embodiments include a combination of both internal and external caches depending on the particular implementation and needs. Register file 1306 is to store different types of data in various registers including integer registers, floating point registers, vector registers, banked registers, shadow registers, checkpoint registers, status registers, and instruction pointer register.

Execution unit 1308, including logic to perform integer and floating point operations, also resides in the processor 1302. The processor 1302, in one embodiment, includes a microcode (ucode) ROM to store microcode, which when executed, is to perform algorithms for certain macroinstructions or handle complex scenarios. Here, microcode is potentially updateable to handle logic bugs/fixes for processor 1302. For one embodiment, execution unit 1308 includes logic to handle a packed instruction set 1309. By including the packed instruction set 1309 in the instruction set of a general-purpose processor 1302, along with associated circuitry to execute the instructions, the operations used by many multimedia applications may be performed using packed data in a general-purpose processor 1302. Thus, many multimedia applications are accelerated and executed more efficiently by using the full width of a processor's data bus for performing operations on packed data. This potentially eliminates the need to transfer smaller units of data across the processor's data bus to perform one or more operations, one data element at a time.

Alternate embodiments of an execution unit 1308 may also be used in micro controllers, embedded processors, graphics devices, DSPs, and other types of logic circuits. System 1300 includes a memory 1320. Memory 1320 includes a dynamic random access memory (DRAM) device, a static random access memory (SRAM) device, flash memory device, or other memory device. Memory 1320 stores instructions and/or data represented by data signals that are to be executed by the processor 1302.

Note that any of the aforementioned features or aspects of the disclosure may be utilized on one or more interconnect illustrated in FIG. 13. For example, an on-die interconnect (ODI), which is not shown, for coupling internal units of processor 1302 implements one or more aspects of the disclosure described above. Or the disclosure is associated with a processor bus 1310 (e.g. Intel Quick Path Interconnect (QPI) or other known high performance computing interconnect), a high bandwidth memory path 1318 to memory 1320, a point-to-point link to graphics accelerator 1312 (e.g. a Peripheral Component Interconnect express (PCIe) compliant fabric), a controller hub interconnect 1322, an I/O or other interconnect (e.g. USB, PCI, PCIe) for coupling the other illustrated components. Some examples of such components include the audio controller 1336, firmware hub (flash BIOS) 1328, wireless transceiver 1326, data storage 1324, legacy I/O controller 1310 containing user input and keyboard interfaces 1342, a serial expansion port 1338 such as Universal Serial Bus (USB), and a network controller 1334. The data storage device 1324 can comprise a hard disk drive, a floppy disk drive, a CD-ROM device, a flash memory device, or other mass storage device.

Figure 14:
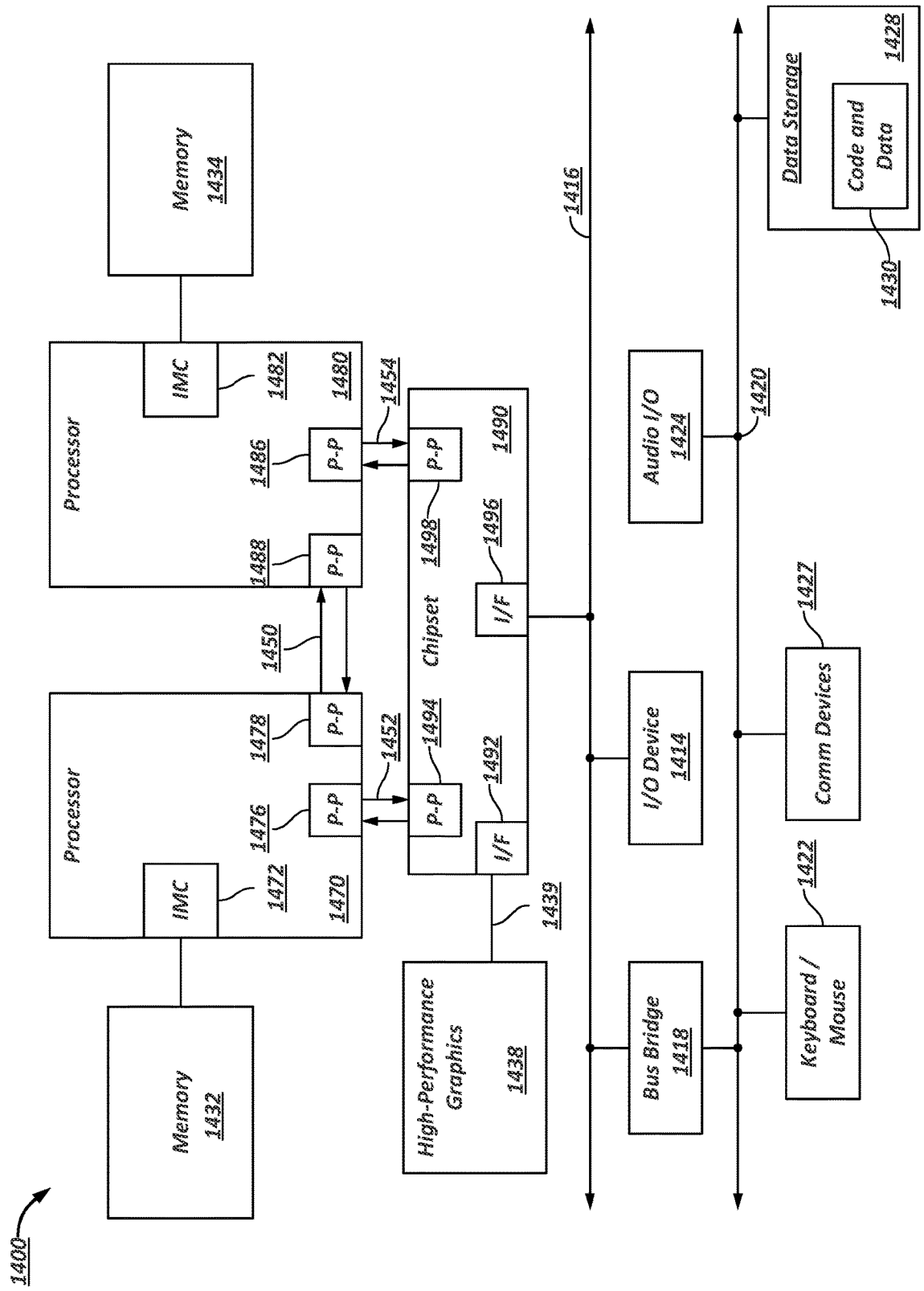
FIG. 14 illustrates an embodiment of a block for a computing system including multiple processor sockets.

Referring now to FIG. 14, shown is a block diagram of a second system 1400 in accordance with an embodiment of the present disclosure. As shown in FIG. 14, multiprocessor system 1400 is a point-to-point interconnect system, and includes a first processor 1470 and a second processor 1480 coupled via a point-to-point interconnect 1450. Each of processors 1470 and 1480 may be some version of a processor. In one embodiment, 1452 and 1454 are part of a serial, point-to-point coherent interconnect fabric, such as Intel's Quick Path Interconnect (QPI) architecture. As a result, the disclosure may be implemented within the QPI architecture.

While shown with only two processors 1470, 1480, it is to be understood that the scope of the present disclosure is not so limited. In other embodiments, one or more additional processors may be present in a given processor.

Processors 1470 and 1480 are shown including integrated memory controller units 1472 and 1482, respectively. Processor 1470 also includes as part of its bus controller units point-to-point (P-P) interfaces 1476 and 1478; similarly, second processor 1480 includes P-P interfaces 1486 and 1488. Processors 1470, 1480 may exchange information via a point-to-point (P-P) interface 1450 using P-P interface circuits 1478, 1488. As shown in FIG. 14, IMCs 1472 and 1482 couple the processors to respective memories, namely a memory 1432 and a memory 1434, which may be portions of main memory locally attached to the respective processors.

Processors 1470, 1480 each exchange information with a chipset 1490 via individual P-P interfaces 1452, 1454 using point to point interface circuits 1476, 1494, 1486, 1498. Chipset 1490 also exchanges information with a high-performance graphics circuit 1438 via an interface circuit 1492 along a high-performance graphics interconnect 1439.

A shared cache (not shown) may be included in either processor or outside of both processors; yet connected with the processors via P-P interconnect, such that either or both processors' local cache information may be stored in the shared cache if a processor is placed into a low power mode.

Chipset 1490 may be coupled to a first bus 1416 via an interface 1496. In one embodiment, first bus 1416 may be a Peripheral Component Interconnect (PCI) bus, or a bus such as a PCI Express bus or another third generation I/O interconnect bus, although the scope of the present disclosure is not so limited.

As shown in FIG. 14, various I/O devices 1414 are coupled to first bus 1416, along with a bus bridge 1418 which couples first bus 1416 to a second bus 1420. In one embodiment, second bus 1420 includes a low pin count (LPC) bus. Various devices are coupled to second bus 1420 including, for example, a keyboard and/or mouse 1422, communication devices 1427 and a storage unit 1428 such as a disk drive or other mass storage device which often includes instructions/code and data 1430, in one embodiment. Further, an audio I/O 1424 is shown coupled to second bus 1420. Note that other architectures are possible, where the included components and interconnect architectures vary. For example, instead of the point-to-point architecture of FIG. 14, a system may implement a multi-drop bus or other such architecture.

Turning to the diagram 1500 of FIG. 15, an example link training state machine is shown, such as the PCIe link training and status state machine (LTSSM). For a system utilizing a PHY according to a particular protocol to support multiple alternative protocols (i.e., to run on top of the PHY), ordered sets may be defined that are to be communicated between two or more devices on a link in connection with the training of the link. For instance, training set (TS) ordered sets (OSes) may be sent. In an implementation utilizing PCIe as the PHY protocol, the TS ordered sets may include a TS1 and a TS2 ordered set, among other example ordered sets. The ordered sets and training sequences sent during link training may be based on the particular link training state, with various link training states utilized to accomplish corresponding link training activities and objectives.

In one example, such as illustrated in FIG. 15, a link training state machine 1600 may include such states as a Reset state, a Detect state (e.g., to detect a far end termination (e.g., another device connected to the lanes), a Polling state (e.g., to establish symbol lock and configure lane polarity), a Configuration (or "Config") state (e.g., to configure the physical lanes of a connection into a link with particular lane width, lane numbering, etc., performing lane-to-lane deskew and other link configuration activities), a Loopback state (e.g., to perform testing, fault isolation, equalization, and other tasks), a Recovery state (e.g., for use to change the data rate of operation, re-establish bit lock, Symbol lock or block alignment, perform lane-to-lane deskew, etc.) among other states, which may be utilized to bring the link to an active link state (e.g., L0). In one example, training sequences to be sent in a particular one (or more) of the link training states may be defined to accommodate the negotiation of a particular one of the supported protocols of a particular device. For instance, the particular training state may be a training state preceding entry into an active link state, or a training state in which the data rate may be upscaled (e.g., beyond that supported by at least one of the supported protocols), such as a PCIe state where a data rate transitions from a Gen1 speed to Gen3 and higher speeds, among other examples. For instance, in the example implementation shown in FIG. 15, a configuration state (e.g., 1505) may be utilized and augmented to allow negotiation of a particular one of multiple protocols in parallel with the link training activities defined natively in the training state (e.g., lane width determination, lane numbering, deskew, equalization, etc.). For instance, particular training sequences may be defined for the training state and these training sequences may be augmented to allow information to be communicated (e.g., in one or more fields or symbols of the ordered set) to identify whether each device on the link supports multiple protocols (e.g., at least one protocol stack other than the protocol stack of the physical layer and the corresponding link training state machine), identify the particular protocols each device supports, and agree upon one or more protocols to employ over the particular PHY (e.g., through a handshake accomplished through the transmission of these training sequences across the link (in both the upstream and downstream directions)).

In one example, a PCIe physical layer may be utilized to support multiple different protocols. Accordingly, a particular training state in a PCIe LTSSM may be utilized for the negotiation of protocols between devices on a link. As noted above, the protocol determination may occur even before the link trains to an active state (e.g., L0) in the lowest supported data rate (e.g., the PCIe Gen 1 data rate). In one example, the PCIe Config state may be used. Indeed, the PCIe LTSSM may be used to negotiate the protocol by using modified PCIe Training Sets (e.g., TS1 and TS2) after the link width negotiation and (at least partially) in parallel with lane numbering performed during the Config state.

While this disclosure has been described with respect to a limited number of embodiments, those skilled in the art will appreciate numerous modifications and variations therefrom. It is intended that the appended claims cover all such modifications and variations as fall within the true spirit and scope of this present disclosure.

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present disclosure.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase "to" or "configured to," in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information there from.

Instructions used to program logic to perform embodiments of the disclosure may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

Reference throughout this specification to "one embodiment" or "an embodiment" means that a particular feature, structure, or characteristic described in connection with the embodiment is included in at least one embodiment of the present disclosure. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

The systems, methods, and apparatuses can include one or a combination of the following examples:

Example 1 is an apparatus comprising a first port to receive a capability configuration message across a link; a message request receiving logic comprising hardware circuitry to identify one or more capabilities of the device identified in the capability configuration message, determine that the one or more capabilities are to be presented or hidden from operation based on a capability hide enable bit in the capability configuration message, and configure a capability linked list to present or hide the one or more capabilities the determination. The apparatus also includes a message response generator logic comprising hardware circuitry to generate a response message indicating that the one or more capabilities are to be presented or hidden from operation. The apparatus also includes a second port to transmit the response message across the link.

Example 2 may include the subject matter of example 1, wherein one or both of the capability configuration message or the response message comprise a transaction layer packet (TLP) based on a Peripheral Component Interconnect Express (PCIe) protocol.

Example 3 may include the subject matter of any of examples 1-2, wherein one or both of the capability configuration message or the response message comprise a vendor-defined message (VDM) transaction layer packet.

Example 4 may include the subject matter of any of examples 1-3, wherein the capability configuration message comprises a capability structure configuration request message identifying one or more capabilities of the apparatus to present or to hide.

Example 5 may include the subject matter of any of examples 1-4, further comprising a capability pointer switch logic to update a next capability field in the capability linked list.

Example 6 may include the subject matter of example 5, wherein the capability linked list comprises a capability identifier and a next capability pointer, the capability identifier indicating an identifier for each capability and the next capability pointer pointing to a next capability in the capability linked list.

Example 7 may include the subject matter of any of examples 1-6, the message request receiving logic to identify for the apparatus a mapping between a capability and a corresponding capability index from a capability structure table; and the response message generator logic to compose a response message indicating the mapping between the capability and the corresponding capability index.

Example 8 may include the subject matter of example 6, the message request receiving logic to receive a capability configuration initialization request message; extract capability structure configuration information from the capability configuration initialization request message; and update the capability structure table with the capability structure configuration information.

Example 9 is a system comprising a host device implemented at least partially in hardware circuitry comprising a system administrator to determine that one or more capability structure configuration features of a connected device, a request message generator circuit to generate a capability configuration read request message, and a response message receiver circuit to receive response messages. The system can include a connected device connected to the host device across a link, the connected device comprising a request message receiver circuit to receive the configuration read request message, and determine capability structure configuration information from a capability structure configuration table stored at the connected device. The connected device can also include a response message generator circuit to compose a capability configuration response message that indicates a mapping between a capability identifier and a capability structure index; and cause the transmission of the capability configuration response message to the host device.

Example 10 may include the subject matter of example 9, wherein the host device comprises a host controller logic to determine that the one or more capabilities are to be presented or hidden from operation based, at least in part on, a received capability configuration response message.

Example 11 may include the subject matter of any of examples 9-10, the system administrator to determine that one or more capability structures are to be hidden or presented to support an entity using the connected device. The request message generator to compose a capability configuration write request message comprising a bit enabling or disabling a capability hide indicator, and cause the transmission of the capability configuration write request message to the connected device.

Example 12 may include the subject matter of any of examples 9-11, a request message receiver circuit to receive the capability configuration write request message; determine one or more capability structures to hide or present based on the capability configuration write request message. The system comprising a capability pointer switch logic to change a capability linked list based on the determined one or more capability structures to hide or present.

Example 13 may include the subject matter of example 12, the connected device comprising a response message generator to transmit a capability configuration response message.

Example 14 may include the subject matter of any of examples 9-13, wherein one or both of the capability configuration read request message or the capability configuration response message comprise a transaction layer packet (TLP) based on a Peripheral Component Interconnect Express (PCIe) protocol.

Example 15 may include the subject matter of any of examples 9-14, wherein one or both of the capability configuration read request message or the capability configuration response message comprise a vendor-defined message (VDM) transaction layer packet.

Example 16 may include the subject matter of any of examples 9-15, wherein the capability configuration read request message comprises a capability structure configuration request message identifying one or more capabilities of the connected device to present or to hide.

Example 17 may include the subject matter of any of examples 9-16, the message request receiving logic to identify for the connected device a mapping between a capability and a corresponding capability index from a capability structure table; and the response message generator logic to compose a response message indicating the mapping between the capability and the corresponding capability index.

Example 18 may include the subject matter of any of examples 9-17, the message request receiving logic to receive a capability configuration initialization request message; extract capability structure configuration information from the capability configuration initialization request message; and update the capability structure table with the capability structure configuration information.

Example 19 may include the subject matter of any of examples 9-18, wherein the link is based on a Peripheral Component Interconnect Express (PCIe) protocol.

Example 20 may include the subject matter of any of examples 9-19, wherein the system administrator comprises one of a host operating system (OS) or a host system BIOS.

Example 21 may include the subject matter of any of examples 9-20, wherein the connected device comprises a root complex integrated end point (RCiEP) compatible with a Peripheral Component Interconnect Express (PCIe) protocol.

Example 22 is a method comprising identifying one or more capabilities of the device identified in the capability configuration message; determining that the one or more capabilities are to be presented or hidden from operation based on a capability hide enable bit in the capability configuration message; configuring a capability linked list to present or hide the one or more capabilities the determination; generating a response message indicating that the one or more capabilities are to be presented or hidden from operation; and transmitting the response message across a link.

Example 23 may include the subject matter of example 22, further comprising updating, by a capability pointer switch logic, a next capability field in the capability linked list.

Example 24 may include the subject matter of example 23, further comprising updating a capability identifier and a next capability pointer of the capability linked list, the capability identifier indicating an identifier for each capability and the next capability pointer pointing to a next capability in the capability linked list.

Example 25 may include the subject matter of any of examples 22-24, further comprising identifying a mapping between a capability and a corresponding capability index from a capability structure table; composing a response message indicating the mapping between the capability and the corresponding capability index; receiving a capability configuration initialization request message; extracting capability structure configuration information from the capability configuration initialization request message; and updating the capability structure table with the capability structure configuration information.

Example 26 is an apparatus comprising a first port to receive a capability configuration message across a link; a means for identifying one or more capabilities of the device identified in the capability configuration message, means for determining that the one or more capabilities are to be presented or hidden from operation based on a capability hide enable bit in the capability configuration message; means for configuring a capability linked list to present or hide the one or more capabilities the determination; means for generating a response message indicating that the one or more capabilities are to be presented or hidden from operation; and a second port to transmit the response message across the link.

What is claimed is:
1. A system comprising:
a host device implemented in hardware circuitry comprising:
a system administrator to determine that capability structure configuration feature of a connected device,
a request message generator circuit to generate a capability configuration read request message, and
a response message receiver circuit to receive response messages;
a connected device connected to the host device across a link, the connected device comprising:
a request message receiver circuit to:
receive the configuration read request message, and
determine capability structure configuration information from a capability structure configuration table stored at the connected device;
a response message generator circuit to:
compose a capability configuration response message that indicates a mapping between a capability identifier and a capability structure index; and
transmit the capability configuration response message to the host device.
2. The system of claim 1, wherein the host device comprises a host controller logic to determine that the capability is to be presented or hidden from operation based on a received capability configuration response message.

3. The system of claim 1, the system administrator to determine that capability structure is to be hidden or presented to support an entity using the connected device; and the request message generator to:
compose a capability configuration write request message comprising a bit enabling or disabling a capability hide indicator, and
transmit the capability configuration write request message to the connected device.

4. The system of claim 3, a request message receiver circuit to:
receive the capability configuration write request message;
determine a capability structure to hide or present based on the capability configuration write request message;
the system comprising:
a capability pointer switch logic to change a capability linked list based on the determined capability structure to hide or present.

5. The system of claim 4, the connected device comprising a response message generator to transmit a capability configuration response message.

6. The system of claim 1, wherein the capability configuration read request message or the capability configuration response message comprises a transaction layer packet (TLP) based on a Peripheral Component Interconnect Express (PCIe) protocol.

7. The system of claim 6, wherein the capability configuration read request message or the capability configuration response message comprises a vendor-defined message (VDM) transaction layer packet.

8. The system of claim 1, wherein the capability configuration read request message comprises a capability structure configuration request message identifying a capability of the connected device to present or to hide.

9. The system of claim 1, the message request receiving logic to identify for the connected device a mapping between a capability and a corresponding capability index from a capability structure table; and
the response message generator logic to compose a response message indicating the mapping between the capability and the corresponding capability index.

10. The system of claim 9, the message request receiving logic to:
receive a capability configuration initialization request message;
extract capability structure configuration information from the capability configuration initialization request message; and
update the capability structure table with the capability structure configuration information.

11. The system of claim 1, wherein the link is based on a Peripheral Component Interconnect Express (PCIe) protocol.

12. The system of claim 1, wherein the system administrator comprises one of a host operating system (OS) or a host system BIOS.

13. The system of claim 1, wherein the connected device comprises a root complex integrated end point (RCiEP) compatible with a Peripheral Component Interconnect Express (PCIe) protocol.

14. An apparatus comprising:
interconnect stack circuitry to connect the apparatus to a connected device across a link;
a request message generator circuit to generate a capability configuration read request message;
a response message receiver circuit to receive a capability configuration response message from the connected device based on the capability configuration read request message;
host controller circuitry to determine, based on the response message, to hide a capability of the connected device.

15. The apparatus of claim 14, wherein the request message generator is to:
compose a capability configuration write request message comprising a bit enabling or disabling a capability hide indicator, and
transmit the capability configuration write request message to the connected device.

16. The apparatus of claim 14, wherein the capability configuration read request message or the capability configuration response message comprises a transaction layer packet (TLP) based on a Peripheral Component Interconnect Express (PCIe) protocol.

17. The apparatus of claim 16, wherein the capability configuration read request message or the capability configuration response message comprises a vendor-defined message (VDM) transaction layer packet.

18. The apparatus of claim 14, wherein the capability configuration read request message comprises a capability structure configuration request message identifying a capability of the connected device to present or to hide.

19. The apparatus of claim 14, wherein the interconnect stack circuitry is to implement a link based on a Peripheral Component Interconnect Express (PCIe) protocol.

20. A method comprising:
generating, at a host device, a capability configuration read request message;
transmitting the capability configuration read request message to a connected device across a link;
receiving a capability configuration response message from the connected device based on the capability configuration read request message;
determining, based on the response message, to hide a capability of the connected device.

21. The method of claim 20, wherein the request message generator is to:
compose a capability configuration write request message comprising a bit enabling or disabling a capability hide indicator, and
transmit the capability configuration write request message to the connected device.

22. The method of claim 20, wherein the capability configuration read request message or the capability configuration response message comprises a transaction layer packet (TLP) based on a Peripheral Component Interconnect Express (PCIe) protocol.

23. The method of claim 22, wherein the capability configuration read request message or the capability configuration response message comprises a vendor-defined message (VDM) transaction layer packet.

24. The method of claim 20, wherein the capability configuration read request message comprises a capability structure configuration request message identifying a capability of the connected device to present or to hide.

25. The method of claim 20, wherein the link is based on a Peripheral Component Interconnect Express (PCIe) protocol.

* * * * *